United States Patent
Zhuang et al.

(10) Patent No.: US 9,185,392 B2
(45) Date of Patent: Nov. 10, 2015

(54) SYSTEM AND METHOD FOR 3-D OBJECT RENDERING OF A MOVING OBJECT USING STRUCTURED LIGHT PATTERNS AND MOVING WINDOW IMAGERY

(71) Applicant: Spatial Integrated Systems, Inc., Gaithersburg, MD (US)

(72) Inventors: Ping Zhuang, North Potomac, MD (US); Yunqi Zhang, Gaithersburg, MD (US)

(73) Assignee: Spatial Integrated Systems, Inc., Gaithersburg, MD (US)

( * ) Notice: Subject to any disclaimer, the term of this patent is extended or adjusted under 35 U.S.C. 154(b) by 351 days.

(21) Appl. No.: 13/674,715

(22) Filed: Nov. 12, 2012

(65) Prior Publication Data
US 2014/0132734 A1    May 15, 2014

(51) Int. Cl.
*H04N 13/02*    (2006.01)
*G01B 11/25*    (2006.01)
*G06K 9/00*    (2006.01)
*G06K 9/46*    (2006.01)

(52) U.S. Cl.
CPC ....... *H04N 13/0253* (2013.01); *H04N 13/0239* (2013.01); *H04N 13/0242* (2013.01); *G01B 11/2513* (2013.01)

(58) Field of Classification Search
CPC .......... H04N 13/0253; H04N 13/0242; H04N 13/0239
See application file for complete search history.

(56) References Cited

U.S. PATENT DOCUMENTS

| | | | | |
|---|---|---|---|---|
| 6,830,184 B2* | 12/2004 | Tsikos et al. | | 235/462.01 |
| 6,930,704 B1* | 8/2005 | Hamada | | 348/42 |
| 6,965,690 B2* | 11/2005 | Matsumoto | | 382/154 |
| 7,986,321 B2 | 7/2011 | Zhuang et al. | | |
| 8,090,194 B2* | 1/2012 | Golrdon et al. | | 382/154 |
| 2009/0169095 A1* | 7/2009 | Zhuang et al. | | 382/154 |
| 2010/0074532 A1* | 3/2010 | Gordon et al. | | 382/203 |

FOREIGN PATENT DOCUMENTS

CN    101245994 A    8/2008

OTHER PUBLICATIONS

International Search Report dated Jun. 27, 2014 issued in PCT counterpart application (No. PCT/US2013/069649).
Written Opinion of the International Searching Authority dated Jun. 27, 2014 issued in PCT counterpart application (No. PCT/US2013/069649).

* cited by examiner

*Primary Examiner* — Jefferey Harold
*Assistant Examiner* — Sean Haiem
(74) *Attorney, Agent, or Firm* — Womble Carlyle

(57) ABSTRACT

A moving object to be subject to 3-dimensional rendering is illuminated by a repeated sequence of a number N different two-dimensional structured light patterns. For each illumination, the illuminated object is captured by two spaced apart cameras, thereby creating a series of pairs of two-dimensional images. A set of N adjacent pairs of the two-dimensional images is used to form a single three-dimensional image frame. A moving window of N adjacent pairs of the two-dimensional images provides a train of such three-dimensional image frames. The object may furthered be illuminated by non-structured light whose captured image reflection may be used as an overlay over the three-dimensional rendered object.

23 Claims, 20 Drawing Sheets

SYSTEM AND METHOD FOR 3-D OBJECT RENDERING OF A MOVING OBJECT USING STRUCTURED LIGHT PATTERNS AND MOVING WINDOW IMAGERY

BACKGROUND OF THE INVENTION

1. Field of the Invention

The present invention is directed to a method for 3-D digital data capture and object rendering of a moving object using multiple structured light patterns and moving window imagery.

2. Background

U.S. Pat. No. 6,512,844 to Bouguet et al., entitled "3D Rendering", discloses a technique for capturing the surface of three-dimensional ("3D") objects using structured lighting. The movement of a shadow, formed by a wand, stick or other pencil-like object, across a 3D object is optically recorded. Variation in brightness on the surface provides a cue for triangulation. By analyzing the variation in brightness of a particular point on the surface, the location of that point is determined based on the movement of the shadow. With known locations for a camera and a light source, the coordinates in space of the point is triangulated. By repeating this process, a collection of coordinates is created. Those coordinates are then used to reconstruct the 3D surface.

U.S. Pat. No. 6,549,288 to Migdal, et al., entitled "Structured-light, Triangulation-Based Three-Dimensional Digitizer", is directed to a system for illuminating an object with a special kind of structured light pattern, recording the shape of the reflected points of light by means of a camera, and reconstructing the 3D shape of the object through a computer using the data points collected from the reflection of the structured light pattern. The reconstruction is performed using a triangulation technique that does not depend on the fixed direction of the light source relative to the camera. The system stores several images of the objects with different illumination patterns. The data is subsequently processed, by a computer system which applies data processing routines, i.e., the model building algorithms which provide 3D surface generation. The data acquisition is simplified to acquiring of only two or, optionally, four images of the object, thereby significantly increasing the digitization speed over that of laser-based scanners. The light source projects both structured light and uniform illumination light from the same apparent source, and that allows for numerical normalization of the images.

U.S. Pat. No. 7,103,212 to Hager et al., entitled "Acquisition of Three-dimensional Images by an Active Stereo Technique Using Locally Unique Patterns" discloses a system and method for acquiring three-dimensional (3-D) images of a scene. The system includes a projection device for projecting a locally unique pattern (LUP) onto a scene, and sensors for imaging the scene containing the LUP at two or more viewpoints (i.e., at two or more cameras). A computing device matches corresponding pixels in the images by using the local uniqueness of the pattern to produce a disparity map. A range map can then be generated by triangulating points in the imaged scene.

U.S. Pat. No. 7,146,036 to An Chang et al., entitled "Multiframe Correspondence Estimation", is directed to systems and methods of multiframe correspondence estimation. Light patterns reflected from the scene are captured at one or more capture planes (i.e., at one or more cameras). In one aspect, a sequence of patterns of light symbols that temporally encode two-dimensional position information in a projection plane with unique light symbol sequence codes is projected onto a scene. A correspondence mapping between multipixel regions in the capture plane and corresponding regions in the projection plane is computed based at least in part on correspondence between light symbol sequence codes captured at the capture plane and light symbol sequence codes projected from the projection plane. In another aspect, the patterns consist of a single plane of light that is swept across the scene. Correspondence is determined based at least in part on exploiting the epipolar constraint associated with any pair of cameras.

U.S. Published Patent Application No. 2005/0088259 to Geng, entitled "System and Method For Three-Dimensional Imaging Systems, discloses an approach for acquiring a surface profile 3D data set of an object. The approach includes illuminating a surface of the object with a sequence of multiple rainbow projection (MRP) structural light patterns, capturing light reflected from the object, and calculating 3D data (X, Y, Z) for each visible point on the object based upon triangulation mathematical principles of the captured reflected light.

U.S. Published Patent Application No. 2007/0115484 to Huang et al., entitled "3D Shape Measurement System and Method Including Fast Three-Step Phase Shifting, Error Compensation and Calibration", discloses a structured light system for object ranging/measurement. The disclosed system implements a trapezoidal-based phase-shifting function with intensity ratio modeling using sinusoidal intensity-varied fringe patterns to accommodate for defocus error. The structured light system includes a light projector constructed to project at least three sinusoidal intensity-varied fringe patterns onto an object that are each phase shifted with respect to the others, a camera for capturing the at least three intensity-varied phase-shifted fringe patterns as they are reflected from the object and a system processor in electrical communication with the light projector and camera for generating the at least three fringe patterns, shifting the patterns in phase and providing the patterns to the projector, wherein the projector projects the at least three phase-shifted fringe patterns sequentially, wherein the camera captures the patterns as reflected from the object and wherein the system processor processes the captured patterns to generate object coordinates.

U.S. Pat. No. 7,986,321 discloses a system and method for illuminating an object in preparation for three-dimensional rendering. The system includes a projection device configured to project at least three two-dimensional structured light patterns onto a 3-dimensional object. At least two cameras detect light reflected by the object in response to the at least three structured light patterns. Each structured light pattern varies in intensity in a first dimension and is constant in a second dimension. A single line along the first dimension of a given structured light pattern is created from a superposition of three or more component triangular waveforms. Each component triangular waveform has an amplitude, a periodicity (frequency), and a phase shift which is implemented as a pixel shift. Each component triangular waveform may be subject to one or more waveshaping operations prior to being summed with the remaining component triangular waveforms. The summed waveform itself may also be subject to waveshaping operations.

SUMMARY OF THE INVENTION

Various systems and methods for of three-dimensional object rendering of a moving object within a field of view are described herein.

According to various implementations of the invention, a method may include a plurality of operations In some implementations, the operations may include illuminating a moving object to be rendered with a repeated sequence of a number N different 2D structured light patterns, wherein N is at least three. In some implementations, the operations may include, for each illumination, capturing a 2D image set reflected off of the moving object at a number K spaced apart camera locations to thereby create a train of captured 2D image sets $H_i$, each captured 2D image set comprising K images, wherein i is a counting integer and K is at least two. In some implementations, the operations may include, for each overlapping set of a number M adjacent captured 2D image sets $H_m$, $H_{m+1}$, ..., $H_{m+M-1}$, obtaining a single 3D rendered object frame $F_m$, to thereby create a train of rendered three-dimensional image frames, each 3D rendered object frame $F_m$ formed from a moving window of said captured 2D image sets $H_m$, $H_{m+1}$, ... $H_{m+M-1}$, wherein M is at least three and not greater than N.

According to various implementations of the invention, a structured light system for three-dimensional object rendering of the moving object may include a light projector configured to illuminate a moving object to be rendered with a repeated sequence of a number N different 2D structured light patterns, wherein N is at least three. The system may further include a number K cameras configured to capture a 2D image set reflected off of the moving object in response to each illumination to thereby create a train of captured 2D image sets $H_i$, each captured 2D image set comprising K images, wherein i is a counting integer and K is at least two. The system may further include a computer configured to: receive 2D image sets from the K cameras and for each overlapping set of a number M adjacent captured 2D image sets $H_m$, $H_{m+1}$, ..., $H_{m+M-1}$, obtain a single 3D rendered object frame $F_m$, to thereby create a train of rendered three-dimensional image frames, each 3D rendered object frame $F_m$ formed from a moving window of said captured 2D image sets $H_m$, $H_{m+1}$, ... $H_{m+M-1}$, wherein M is at least three and not greater than N.

According to yet another aspect, the present invention is directed to a light projector configured for use in a structured light system for three-dimensional object rendering. The light projector includes at least three memory areas, each having stored therein a different 2D structured light pattern suitable for illuminating a moving object for 3D rendering. The light projector is devoid of a color wheel in a light path used to illuminate the moving object. The light projector is configured to illuminate the moving object with a repeated sequence of the at least three different 2D structured light patterns, and further configured to illuminate the moving object with non-structured light after each sequence of the at least three different 2D structured light patterns.

In such a light projector, each structured light pattern is derived from a corresponding aperiodic waveform replicated in a second dimension; each aperiodic waveform is derived from the same set of component triangular waveforms; and a given aperiodic waveform is created using a unique set of phase shifts applied to members of said same set of component triangular waveforms.

Also, such a light projector may be further configured to illuminate the moving object with non-structured light after each sequence of the at least three different 2D structured light patterns.

DETAILED DESCRIPTION OF THE INVENTION

The contents of aforementioned U.S. Patents and Published Patent Applications are incorporated by reference in their entirety.

Figure 1:
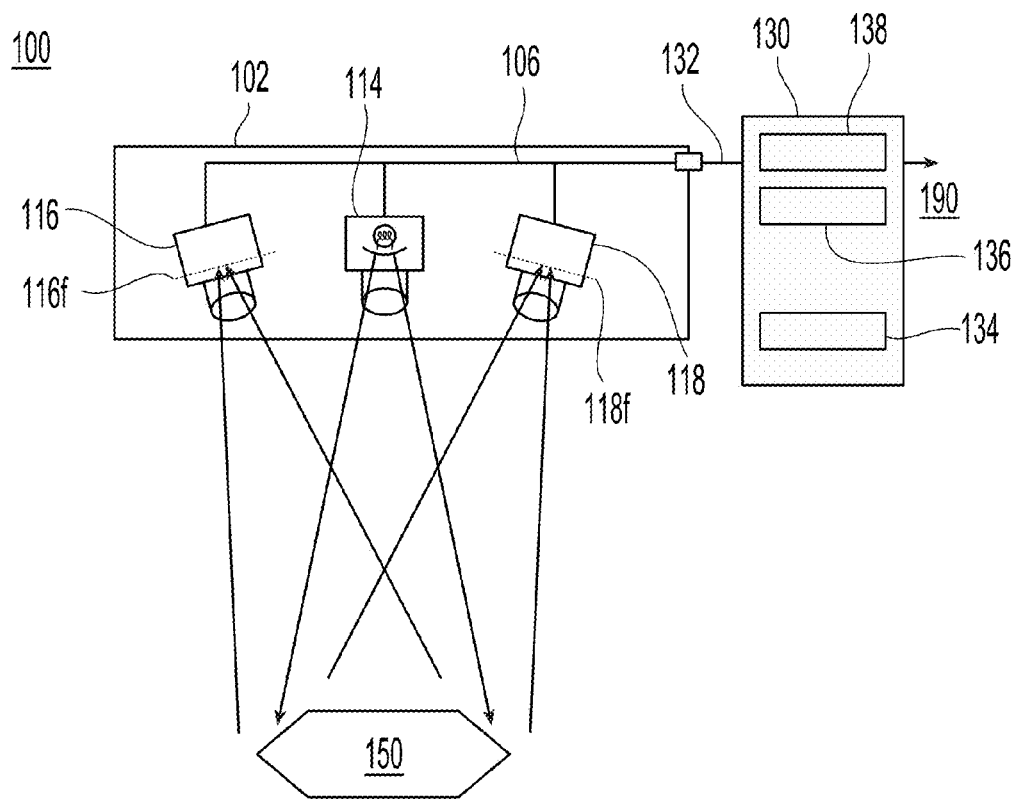
FIG. 1 shows an exemplary system for performing 3-D rendering of an object, in accordance with one embodiment of the present invention.

FIG. 1 shows a system 100 configured to illuminate a 3-dimensional object 150 with structured light and subsequently capture and process structured light reflected by the object 150. The object 150 can be any 3-dimensional item, such a person's face or body, an inanimate structure or other item of interest which can be brought within the field of view of the system.

The system 100 includes an illumination/capture device 102 connected to a computer 130. The system 100, or at least a component thereof, preferably is connected to a network 190, such as a local area network or even the internet. In the latter case, the system 100 (or the computer 130) has a address, such as an IP-v6 address.

In the embodiment shown, the computer 130 is shown to be separate from the illumination/capture device 102, but physically connected thereto by a cable 132. In other embodiments, however, the computer 130 may be connected to the illumination/capture device 102 via a wireless link, such as a Bluetooth link. In still other embodiments, the computer 130 and the illumination/capture device 100 are integrated into a unitary housing.

The illumination/capture device 102 comprises a housing 112 which accommodates a light projector 114, a first camera 116 and a second camera 118. A bus 106, which is electrically connected to the cable 132, connects the projection device 114 and the two cameras 116, 118. The light projector 114 and the two cameras 116, 118 are rigidly mounted within the housing 112 so that they do not move relative to one another. Furthermore, the relative positions of the illumination/capture device 102 and the two cameras are known to the computer 130, for reasons discussed below. By virtue of the light projector 114 and the two spaced apart cameras 116, 118, at least one embodiment of the present invention comprises a 3-D rendering system that employs structured light for illumination and stereo vision for detection.

The light projector 114 is capable of projecting a two-dimensional image having a pattern specified in a pixel memory array. Typically, the pixel memory array may be part of a memory 138 associated with the computer 130, although it may instead or also be part of the light projector 114. In one embodiment, the light projector 114 is a commercial off-the-shelf digital light projector (DLP). It is noted, however, that other light projectors employing one or more of a variety of technologies capable of displaying the desired pattern may be employed. Thus, in the present context, the term "light projector" is intended to cover projection devices employing DLP, LEDs, CRTs, fiber optic systems, laser illumination and even slide projectors which accommodate a series of slides projecting the precomputed 2D images discussed herein.

The cameras 116, 118 are digital cameras, each capable of capturing light reflected by the object of interest 150. In one embodiment, the camera has a CCD array, a CMOS array, or the like, which is configured to capture an image along a corresponding focal plane 116f, 118f, respectively. In one embodiment, each camera 116, 118 comprises model no. FFMV-03MTM-CS available from the Point Grey Research, Inc. It is understood, however, that other digital cameras may be used instead.

While only two cameras are shown in the embodiment of FIG. 1, it is understood that three or more spaced apart cameras may be used, as seen in FIG. 1 of aforementioned U.S. Pat. No. 7,103,212 to Hager, et al. It is noted, though, that when three or more cameras are used, there is no requirement that the cameras lay in the same plane. What is desired, however, is that the relative positions of the focal planes of the cameras be known, since this information facilitates pixel matching along epipolar lines. Additionally, it may even be possible to use a single camera and projector, but this requires that the camera and projection system be calibrated together so that the projection system's optics can be included in the computation of the epipolar lines.

Prior to using the system 100 on an object 150, the working field of view should be defined. For this, the light projector 114 and the cameras 116, 118 should be calibrated to establish minimum and maximum depth of view, and also to establish the geometry of the cameras' field of view, in all directions.

The computer 130 has two important functions, depicted as function blocks 134 and 136. The function blocks 134 and 136 may entirely be implemented in software to be executed on the computer's processor, or may be at least partially implemented using specialized co-processors, ASICs, or other hardware.

Function block 134 processes images from the cameras 116, 118 to perform 3-D rendering of the object of interest. For this, function block 134 employs an approach that matches image points on a pair of stereo images using epipolar line analysis techniques known to those skilled in the art. U.S. Pat. No. 5,719,954, whose contents are incorporated by reference, discloses a suitable approach for present purposes.

Function block 136 creates the two-dimensional structured light patterns which are projected by the light projector 114 onto the object 150.

Figure 2:
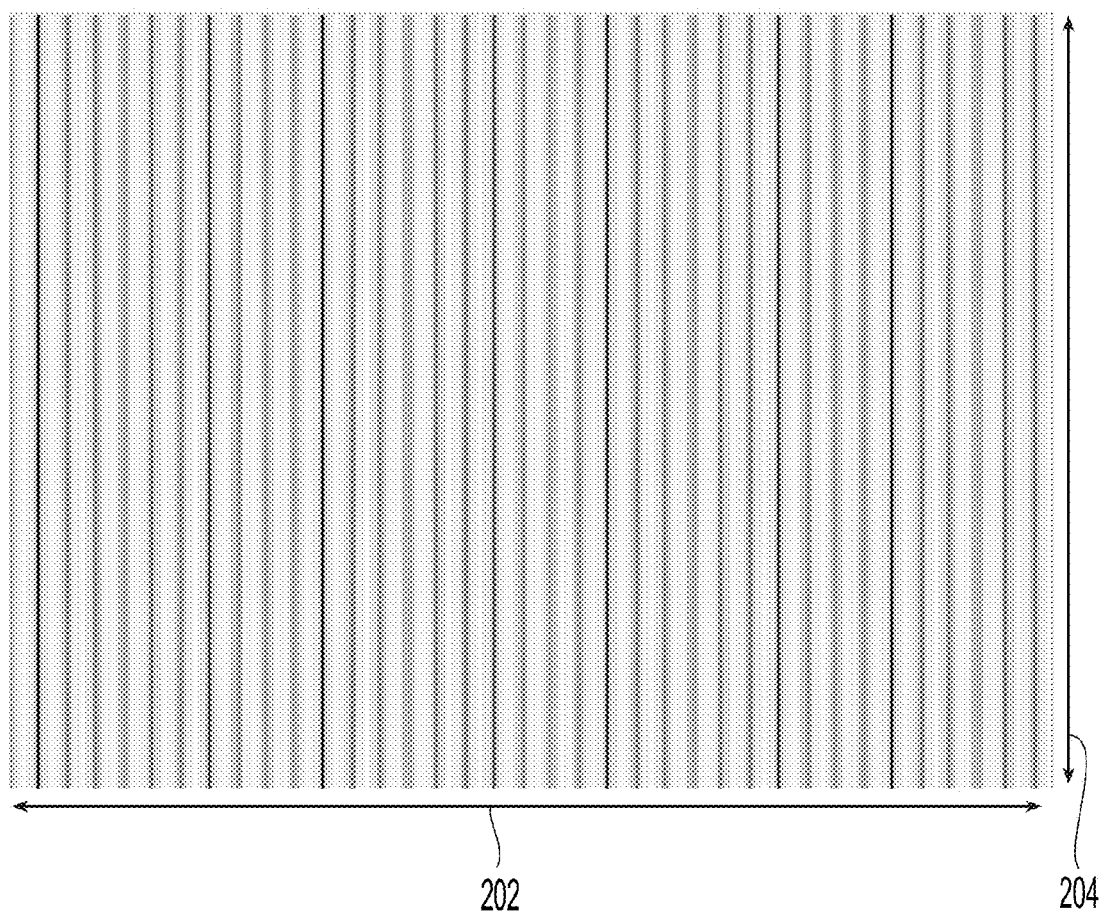
FIG. 2 shows an exemplary structured light pattern in accordance with one embodiment of the present invention.

FIG. 2 shows a portion of an exemplary two-dimensional structured light pattern 200 of sort created by function block 136, in accordance with one embodiment of the present invention. In FIG. 2, only 256 columns of the structured light pattern are shown. In one embodiment, a complete two-dimensional structured light pattern may have on the order of N=768 rows and M=1024 columns of pixels. It is understood, however, that other image sizes may instead be used, depending on the capabilities of the projection device used to illuminate an object.

The intensity of light in the structured light pattern 200 varies in a first dimension 202 and is constant in a second dimension 204 that is perpendicular to the first dimension. As seen in the exemplary embodiment of FIG. 2, the light intensity (i.e., the pixel values) of the structured light pattern varies 200 along the horizontal dimension 202, and is constant along the vertical dimension 204. It is understood, however, that one may equivalently employ a structured light pattern having constant light intensity along the horizontal dimension and a varying light intensity along the vertical direction. In the remainder of this disclosure, without loss of generality, we shall assume that the light intensity varies in the horizon direction.

To create the exemplary structured light pattern seen in FIG. 2, one need only generate a single line of pixel values, and then replicate this single line in the vertical dimension. In one embodiment, the structured light pattern 200 is stored in a memory 138 associated with the processor. In embodiments in which a plurality (e.g., two, three, or even more) of structured light patterns are used, all the structured light patterns may be stored in memory 138. The structured light pattern(s) stored in this memory 138 is/are then transferred to the light projector 114 which illuminates the object 190.

In some embodiments, for each structured light pattern, the processor is programmed to create a single line of pixels and then replicate this line before storing the pattern in memory 138. In other embodiments, the structured light pattern(s) is/are created beforehand and stored in a non-volatile memory associated with the computer 130, and so the processor is not used to create the structured light pattern(s). Either way, the structured light pattern(s) is/are stored in memory prior to being sent to the light projector 114.

In one embodiment, the single line of pixels is created by summing a plurality of component triangular waveforms. In contrast to a sinusoidal waveform, each such component triangular waveform is characterized by well-defined peaks and troughs and substantially linear portions between each peak and trough. Each such component triangular waveform has a minimum and a maximum pixel value (amplitude range), a periodicity (or, alternatively, the length of a single triangle's rise and fall) and a phase shift. In one embodiment, the minimum and maximum pixel values for a gray-scale image may range between 0-255 (8-bit pixels); the periodicity may be expressed as a length, in pixels, of a single triangle representing its rise to a peak and a return to its initial value; and the phase shift may be expressed as a number of pixels less than the length of a single triangle. Preferably, the periodicity is an odd-numbered integer so each triangle is symmetric about its peak. It is understood that in other embodiments, a different number of bits may be used for each pixel, the periodicity may simply be expressed as a spatial frequency, such as the number of cycles within the image, and the phase shift may be manifested as a decimal proportion ranging from 0.0 and 1.0.

The exemplary structured light pattern 200 of FIG. 2 comprises four component triangular waveforms. In other embodiments, a structured light pattern may comprise other numbers of component triangular waveforms, such as three, five and possibly even higher numbers, to form the single line of pixel values which then is replicated in the vertical direction.

Figure 3:
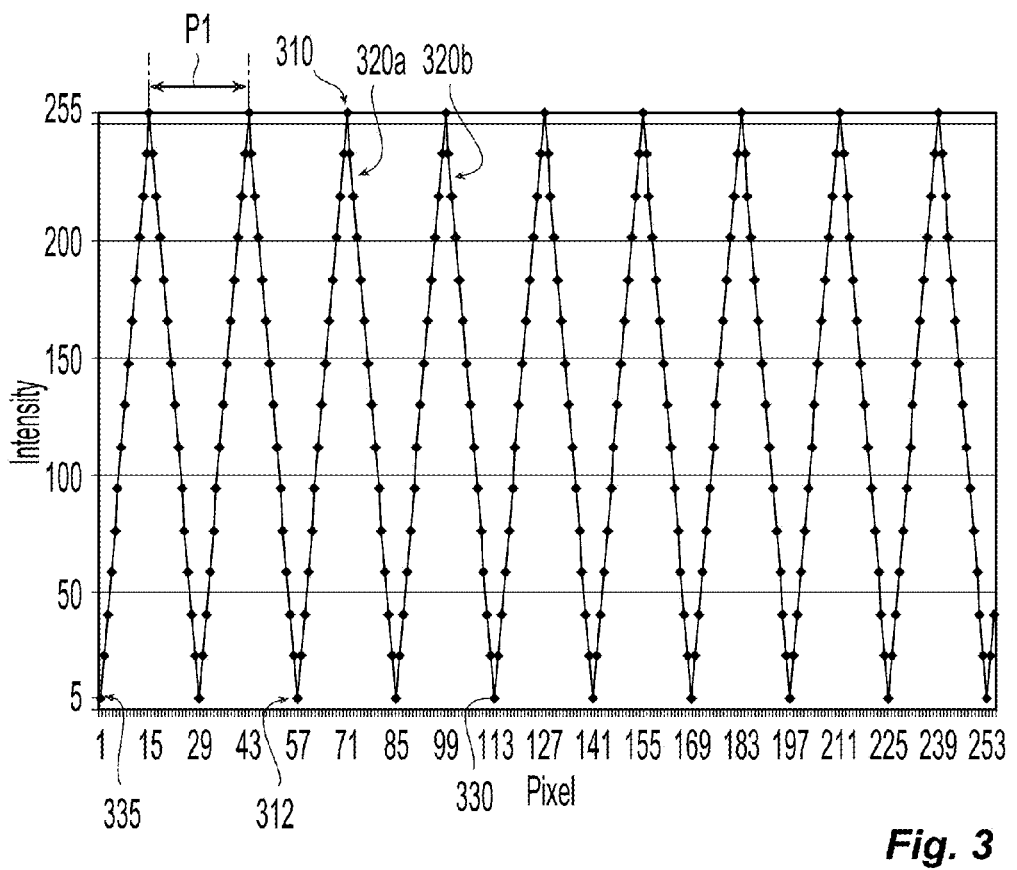
FIG. 3 shows a first exemplary triangular component waveform used to create the exemplary structured light pattern of FIG. 2.

FIG. 3 shows the first 256 pixels (samples) of a 1024 pixel-long first component triangular waveform 300 which is used to create a single line of pixel values. The first component triangular waveform 300 has a maximum pixel value of 255 and a minimum pixel value of 5. These are manifested in a first component peak 310 and a first component valley 312. The first component triangular waveform 300 has a periodicity P1=29 and so adjacent peaks are separated by 29 pixels, and the 15$^{th}$ pixel within a given period forms a peak. Cast in different terms, a total of roughly 1024/29≈35 cycles of triangles of length 29 pixels each, are present in a single line of length 1024-pixels. Given a pixel range of 255−5=250, and 14 steps between the minimum and maximum pixel values, the 8-bit integer pixel values of adjacent pixels in a given period differs by a first step size of either 17 or 18 (since 250/14≈17.8). Furthermore, the last pixel of one triangle 320*a* also serves as the first pixel of the following triangle 320*b*, so that the first component triangular waveform 300 comprises a succession of identical triangles, each pair of adjacent triangles sharing a valley pixel 330. The phase shift of the first component triangular waveform is zero pixels, and so the pixel value of the first pixel 335 is the minimum pixel value of 5.

Figure 4:
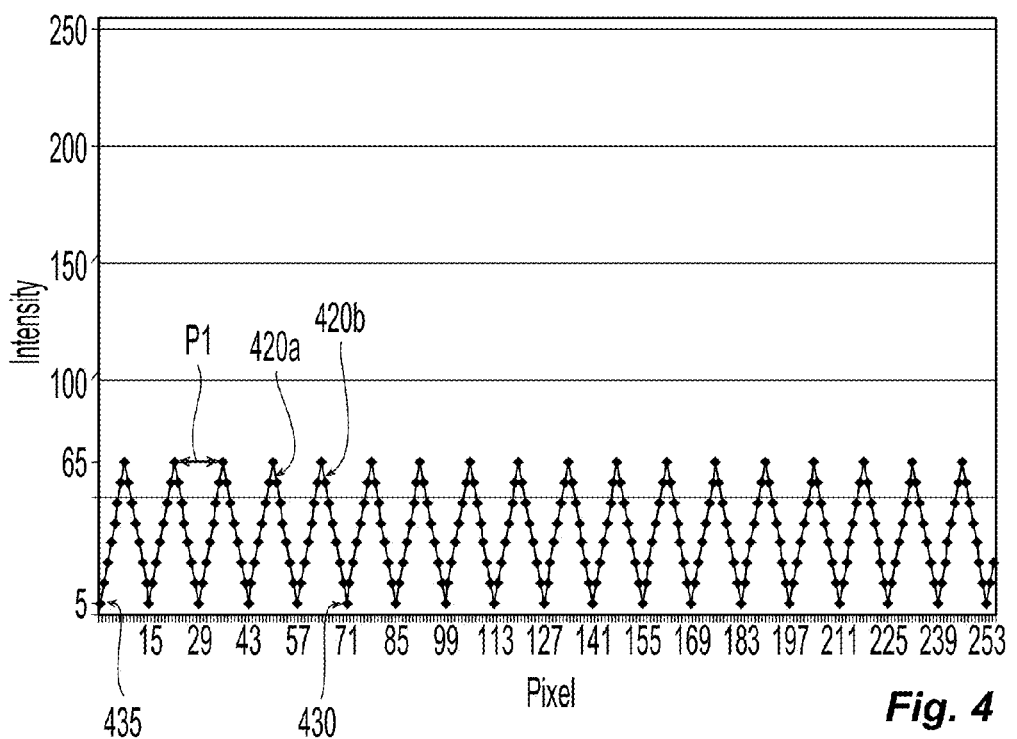
FIG. 4 shows a second exemplary triangular component waveform used to create the exemplary structured light pattern of FIG. 2.

FIG. 4 shows the first 256 pixels of a 1024 pixel-long second component triangular waveform 400. The second component triangular waveform 400 has a maximum pixel value of 65 and a minimum pixel value of 5. The second component triangular waveform 400 has a periodicity P2=15 and so adjacent peaks are separated by 15 pixels, and the 8$^{th}$ pixel within a period forms a peak. Given a pixel range of 65−5=60, and 7 steps between the minimum and maximum pixel values, the 8-bit integer pixel values of adjacent pixels in a given period differ by a second step size of either 8 or 9 (since 60/7≈8.5). Again, the last pixel of one triangle 420*a* also serves as the first pixel of the following triangle 420*b*, so that the second first component triangular waveform 400 comprises a succession of identical triangles, each pair of triangles sharing a valley pixel 430. The phase shift of the second component triangular waveform 400 is zero pixels, and so the pixel value of the first pixel 435 is the minimum pixel value of 5.

Figure 5:
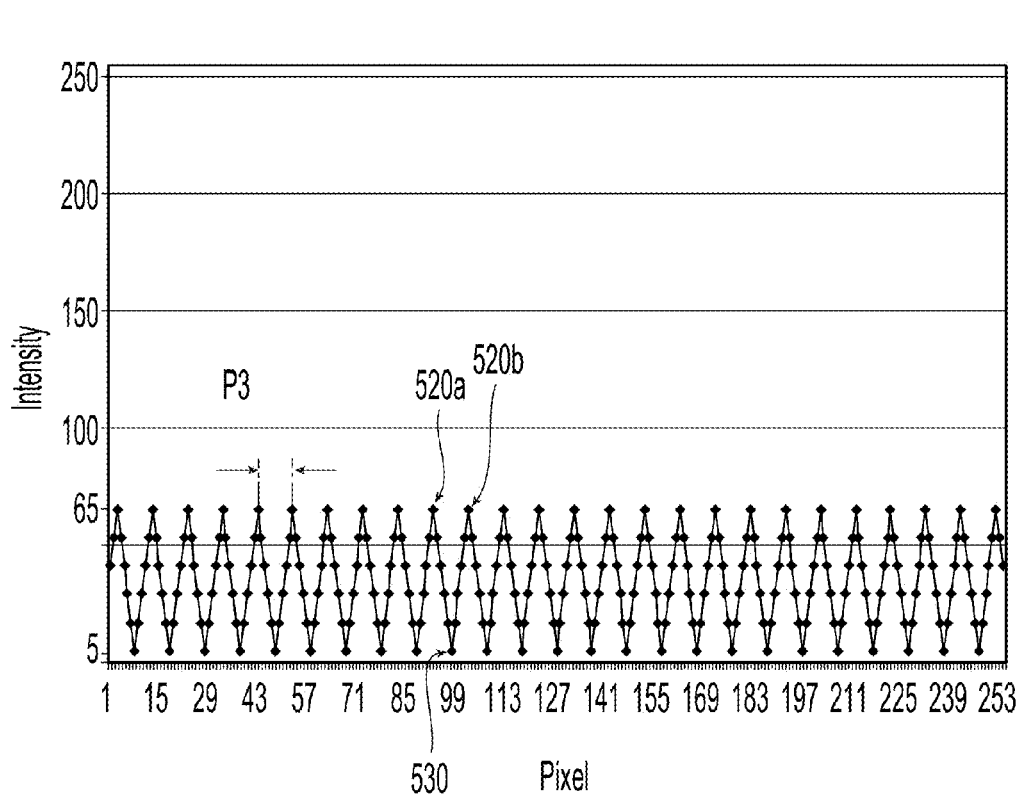
FIG. 5 shows a third exemplary triangular component waveform used to create the exemplary structured light pattern of FIG. 2.

FIG. 5 shows the first 256 pixels of a 1024 pixel-long third component triangular waveform 500. The third component triangular waveform 500 also has a maximum pixel value of 65 and a minimum pixel value of 5. The third component triangular waveform 500 has a periodicity P3=11 and so adjacent peaks are separated by 11 pixels, and the 6$^{th}$ pixel within a period forms a peak. Given a pixel range of 65−5=60, and 5 steps between the minimum and maximum pixel values, the 8-bit integer pixel values of adjacent pixels in a given period differ by a third step size of 12 (since 60/5=12). Again, the last pixel of one triangle 520*a* also serves as the first pixel of the following triangle 520*b*, so that the third component triangular waveform 500 comprises a succession of identical triangles, each pair of triangles sharing a valley pixel 530. The phase shift of the third component triangular waveform 500 is three pixels, and so the pixel value of the first pixel 535 is the same as that of the fourth pixel in an unshifted single triangle, which would be a pixel value of 41.

Figure 6:
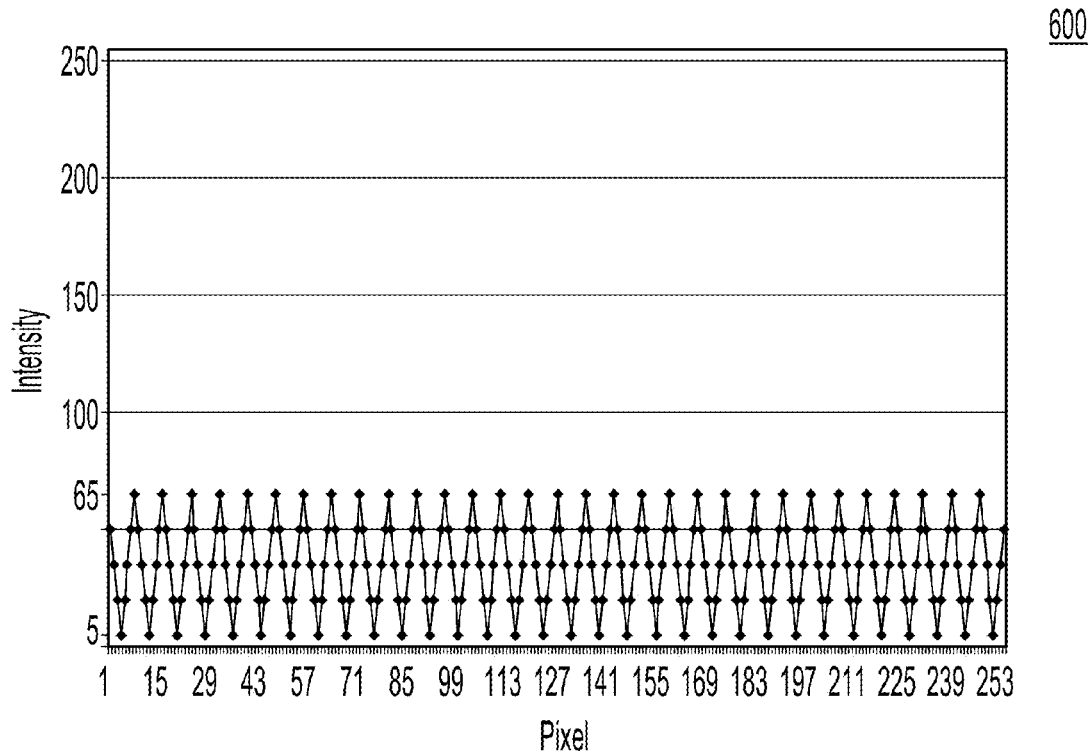
FIG. 6 shows a fourth exemplary triangular component waveform used to create the exemplary structured light pattern of FIG. 2.

FIG. 6 shows the first 256 pixels of a 1024 pixel-long fourth component triangular waveform 600. The third component triangular waveform 600 also has a maximum pixel value of 65 and a minimum pixel value of 5. The fourth component triangular waveform 600 has a periodicity P4=9 and so adjacent peaks are separated by 9 pixels, and the 5$^{th}$ pixel within a period forms a peak. Given a pixel range of 65−5=60, and 4 steps between the minimum and maximum pixel values, the 8-bit integer pixel values of adjacent pixels in a given period differ by a third step size of 15 (since 60/4=15). Again, the last pixel of one triangle 520*a* also serves as the first pixel of the following triangle 520*b*, so that the third component triangular waveform 500 comprises a succession of identical triangles, each pair of triangles sharing a valley pixel 530. The phase shift of the fourth component triangular waveform 600 is six pixels, and so the pixel value of the first pixel 535 is the same as that of the 6$^{th}$ pixel in an unshifted single triangle, which would be a pixel value of 50 (single step of 15 down, from the peak of 65).

Figure 7:
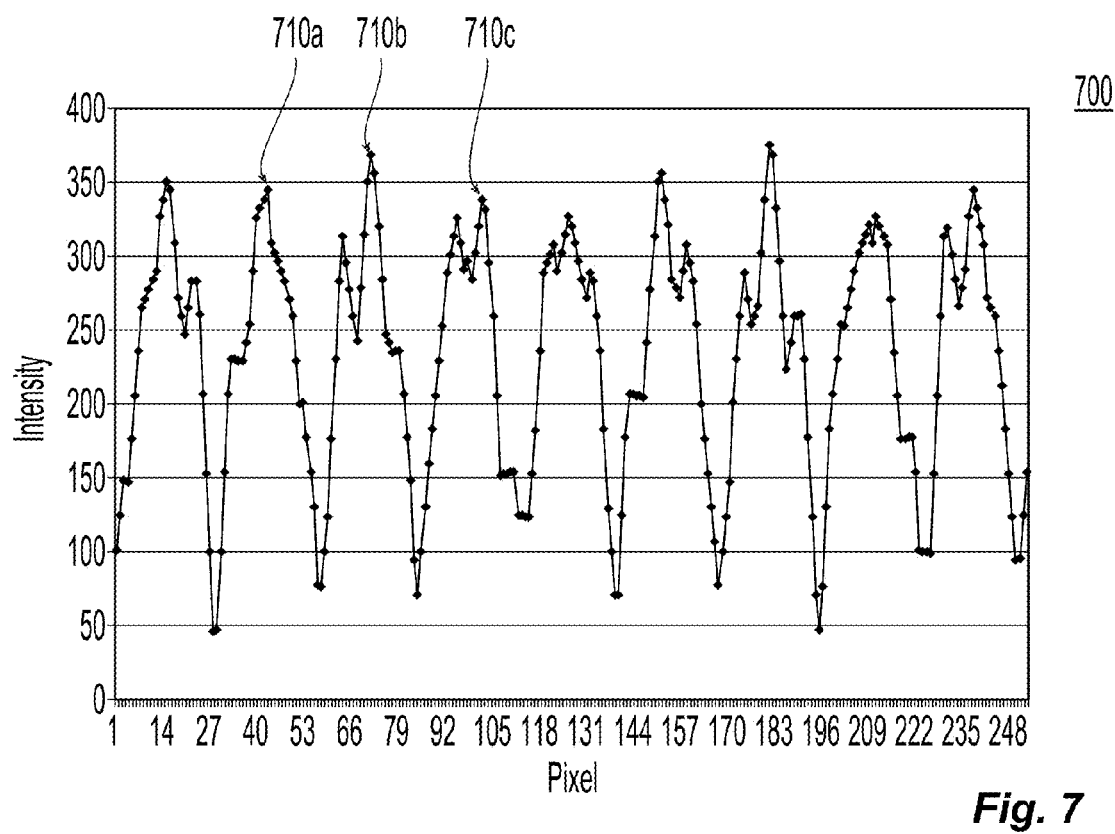
FIG. 7 shows a combined waveform comprising a sum of the exemplary triangular component waveforms of FIGS. 3-6.

FIG. 7 shows the first 256 pixels of an aperiodic summed waveform 700 created by summing the four component triangular waveforms 300, 400, 500 and 600, point-by-point. Due to the larger amplitude of the first component triangular waveform relative to the remaining component waveforms (maximum pixel value of 255 vs. 65), the aperiodic summed waveform 700 is dominated by peak regions 710*a*, 710*b*, 710*c*, etc. whose centers are spaced apart by roughly 29 pixels.

Figure 8:
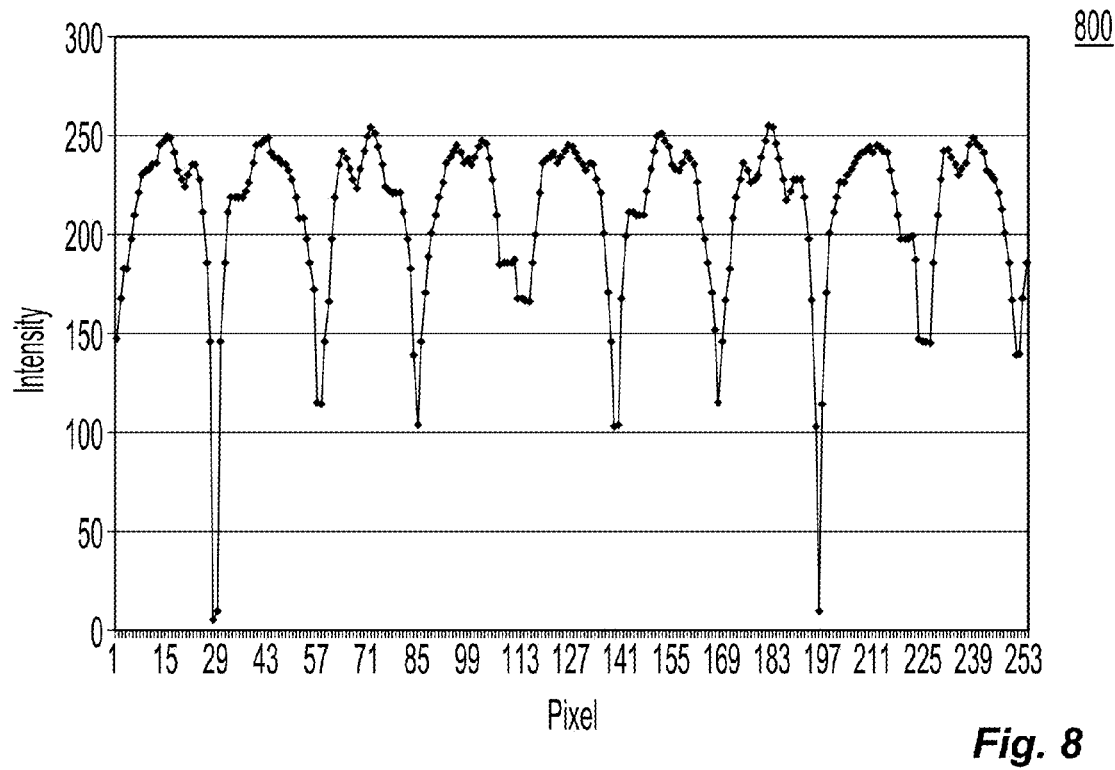
FIG. 8 shows a first waveform pattern derived from a linear combination of shifted versions of the exemplary triangular waveforms of FIGS. 3-6.

This aperiodic summed waveform 700 is subject to additional signal conditioning to form a first illuminating waveform 800 (see FIG. 8). The signal condition may include normalizing the aperiodic summed waveform 700, such as by scaling down all pixel values to fall within a range of 0.0-1.0, thereby forming a normalized waveform. The signal conditioning may also, or instead, include gamma correcting the waveform by raising each pixel value to some factor. In one embodiment, each pixel value is raised to a power of γ=0.9 to form a gamma-corrected waveform. The signal conditioning may also, or instead, include scaling up the waveform so that the pixel value range matches that of the projection device, thereby forming an illuminating waveform. In one embodiment, the light projector requires 8-bit pixel values and so the pixel values of the gamma-corrected waveform are scaled to between 5-250. It is understood, however, that in other embodiments, the pixel values may be scaled to another range of minimum and maximum values, while in still other embodiments, the light projector may require pixel values having some other number of bits.

In one embodiment, all three of these procedures are performed. The aperiodic summed waveform 700 is first normalized to thereby form a normalized waveform. The normalized waveform is then subject to gamma correction to form a gamma-corrected waveform. Next, the gamma-corrected waveform is scaled in accordance with the light projector to form the first illuminating waveform 800. Once the illuminating waveform has been created, it is replicated in the vertical dimension to form a first structured light pattern, such as image 200 (See FIG. 2).

Each of the four above-described component waveforms comprises a train of isosceles triangles, the triangles of a given component waveform rising and falling at substantially the same rate, subject to spatial sampling. It should be understood, however, that the triangular waveforms need not be of isoceles shape. Thus, in the present context, the term 'triangular waveform' is intended to encompass a waveform whose individual cycles comprise sides with substantially constant slopes (though different sides may have a different slope) and sharp peaks. The substantially constant slopes and relatively peaks and troughs of triangular waveforms contrast with, e.g., sinusoidal curves having varying slopes and relatively smooth peaks. After gamma correction, the summed waveforms are no longer triangular, but still retain relatively sharp peaks.

In accordance with one embodiment of the present invention, the light projector 114 outputs three such structured light patterns in rapid succession. Each of the three structured light patterns is formed from three corresponding illuminating waveforms which are replicated in the vertical direction. The three corresponding illuminating waveforms differ from one another in the phase shifts of the four component triangular waveforms. Table 1 shows one embodiment of the combinations of phase shift parameters that may be used with the four component triangular waveforms to create each of three aperiodic summed waveforms.

The three structured light patterns are output by the projection device 114, one after the other, to illuminate the object 150. The first and second cameras 116, 118 each capture an image of the illuminated object 150, substantially simultaneously, after each such structured light illumination. This results in two images taken from slightly different perspectives (e.g., "left" and "right" camera views) for each such structured light illumination, for a total of six captured images. In a preferred embodiment, the three structured light illuminations and the six image captures occur within less than 0.5 seconds.

In addition to illumination by the three structured light patterns, the object may also be illuminated by unpatterned (non-structured) light from the light projector 114, either before or after the structured light pattern illuminations. This fourth illumination is used to capture object texture (or object color), which may then be used to overlay or "paint" the object upon completion of the 3-D rendering process.

Figure 11:
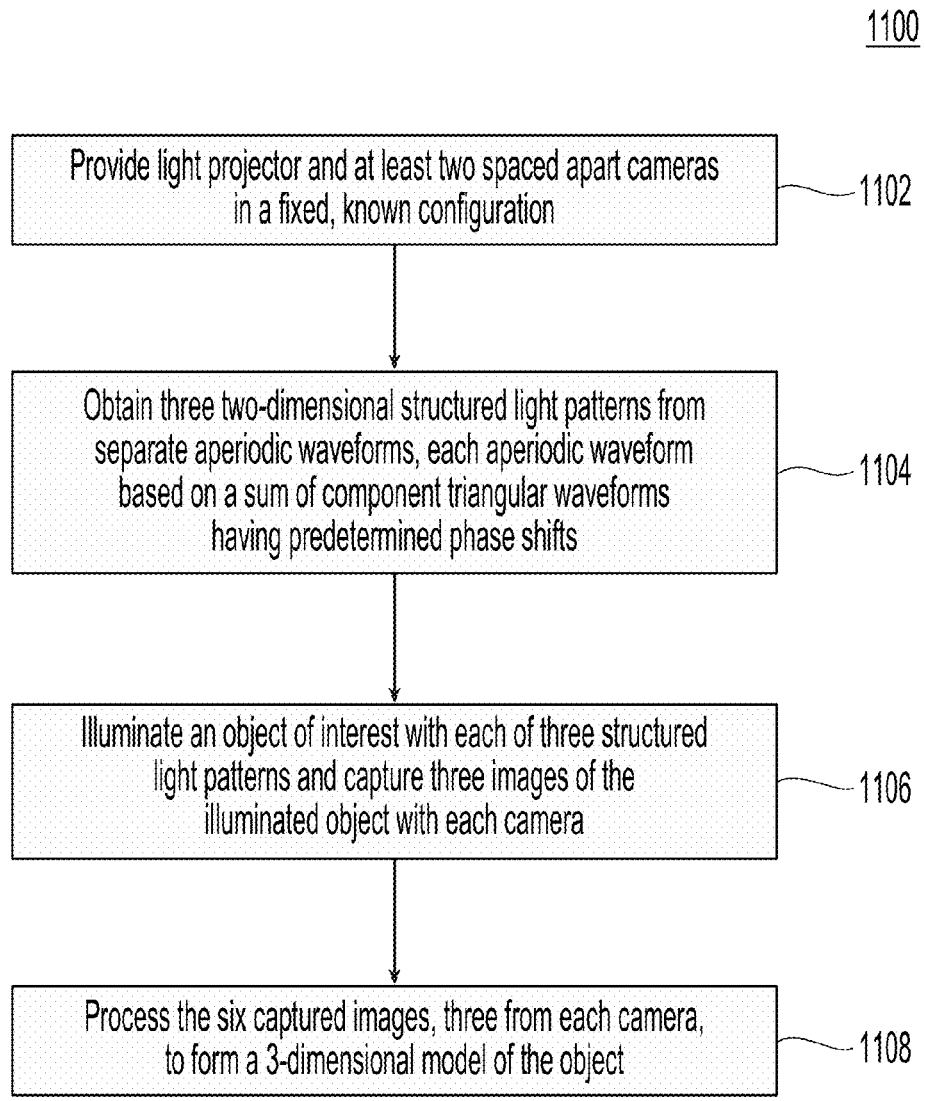
FIG. 11 shows a simplified flow chart of the principal steps for illuminating an object in accordance with one embodiment of the present invention.

FIG. 11 presents a high-level flowchart 1100 of the steps to perform 3-dimensional rendering in accordance with one embodiment of the present invention. In step 1102, the light projector 114 and at least two spaced apart cameras 116, 118 are provided in a fixed, known configuration, such as being rigidly mounted on a common structure, such as housing 102 having unitary construction. In step 1104, three two-dimensional structured light patterns are obtained using separate aperiodic waveforms, each aperiodic waveform based on a sum of component triangular waveforms having predetermined phase shifts. These two-dimensional structured light

TABLE 1

Phase shifts for four component triangular waveforms to create three aperiodic summed waveforms

| | Phase Shift (decimal and in pixels) for 1$^{st}$ Triangular Waveform period = 29; ampli = [5, 255] | Phase Shift (decimal and in pixels) for 2$^{nd}$ Triangular Waveform period = 15; ampli = [5, 65] | Phase Shift (decimal and in pixels) for 3$^{rd}$ Triangular Waveform period = 11; ampli = [5, 65] | Phase Shift (decimal and in pixels) for 4$^{th}$ Triangular Waveform period = 9; ampli = [5, 65] |
|---|---|---|---|---|
| Aperiodic Summed Waveform #1 | 0.0<br>0 pixels | 0.0<br>0 pixels | 0.3333<br>3 pixels | 0.6667<br>6 pixels |
| Aperiodic Summed Waveform #2 | 0.3333<br>9 pixels | 0.3333<br>5 pixels | 0.6667<br>7 pixels | 0.0<br>0 pixels |
| Aperiodic Summed Waveform #3 | 0.6667<br>19 pixels | 0.6667<br>10 pixels | 0.0<br>0 pixels | 0.3333<br>3 pixels |

Thus, in this example, all three aperiodic summed waveforms are created by the superposition of the same four component triangular waveforms, but with a different combination of the four phase shifts. Due to this linear superposition, all three aperiodic summed waveforms have the same total spectral energy. Furthermore, the three structured light patterns ultimately derived from the three aperiodic summed waveforms (and ultimately used to illuminate the object 150) more or less also have the same total spectral energy.

Figure 9:
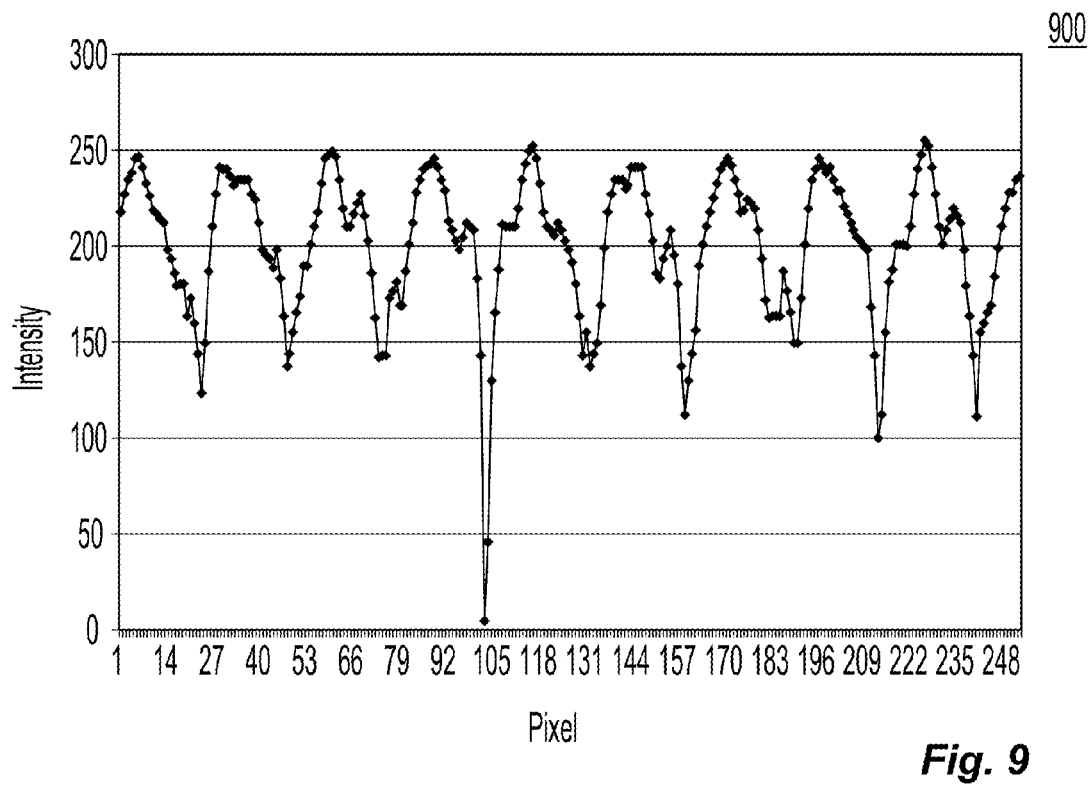
FIG. 9 shows a second waveform pattern derived from a linear combination of shifted versions of the exemplary triangular waveforms of FIGS. 3-6.
Figure 10:
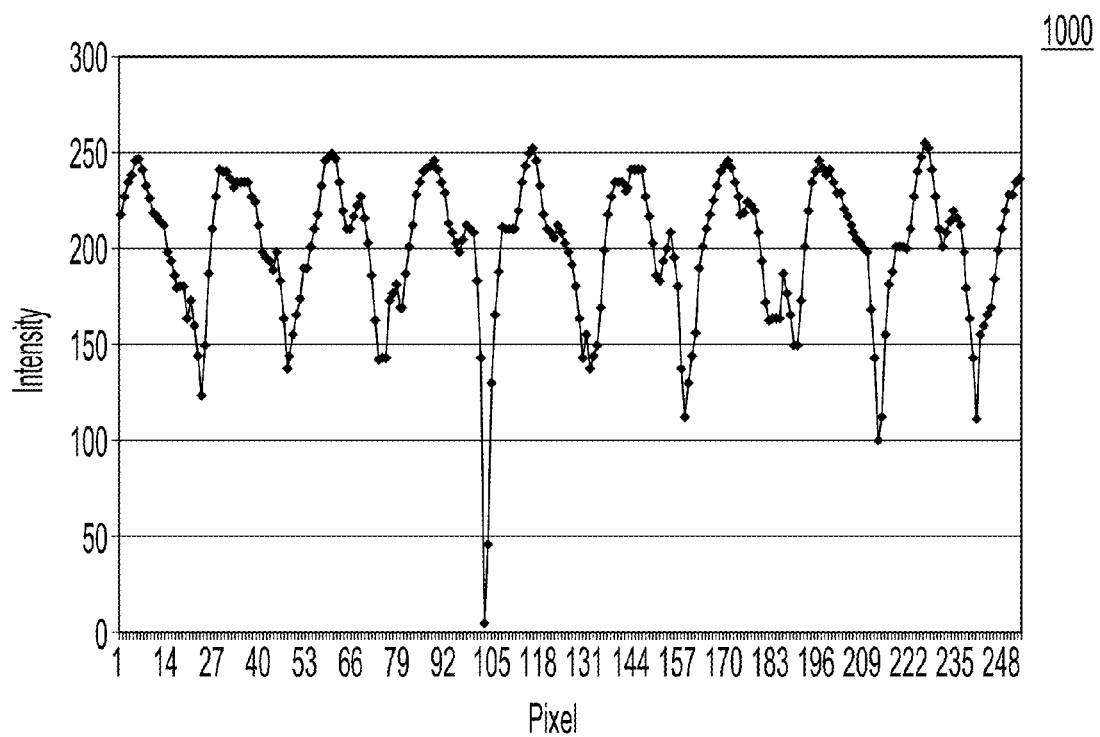
FIG. 10 shows a third waveform pattern derived from a linear combination of shifted versions of the exemplary triangular waveforms of FIGS. 3-6.

While FIG. 8 shows the first illuminating waveform 800, FIG. 9 shows the second illuminating waveform 900 and FIG. 10 shows the third illuminating waveform 1000. Each of these illuminating waveforms results from forming a corresponding aperiodic summed waveform using the phase shifts found in Table 1 and then subjecting each resulting aperiodic summed waveform to the signal conditioning described above. Each of the one-dimensional illuminating waveforms 800, 900 and 1000 may be replicated in a vertical dimension to form a total of three structured light patterns a portion 200 of the first of these appearing in FIG. 2.

patterns are stored in memory 138 so that they may be produced, when needed to illuminate an object. In some embodiments, the three two-dimensional structured light patterns are created in advance and stored in the memory 138—i.e., they are "canned", and so need not be produced on the fly. In step 1106, the light projector 114 is fed the three two-dimensional structured light patterns in sequence so as to illuminate the object 150, and capture the reflected light from each such illumination using cameras 116, 118. Finally, in step 1108, the six captured images, three from each camera are processed to form a 3-dimensional model of the object.

Figure 12:
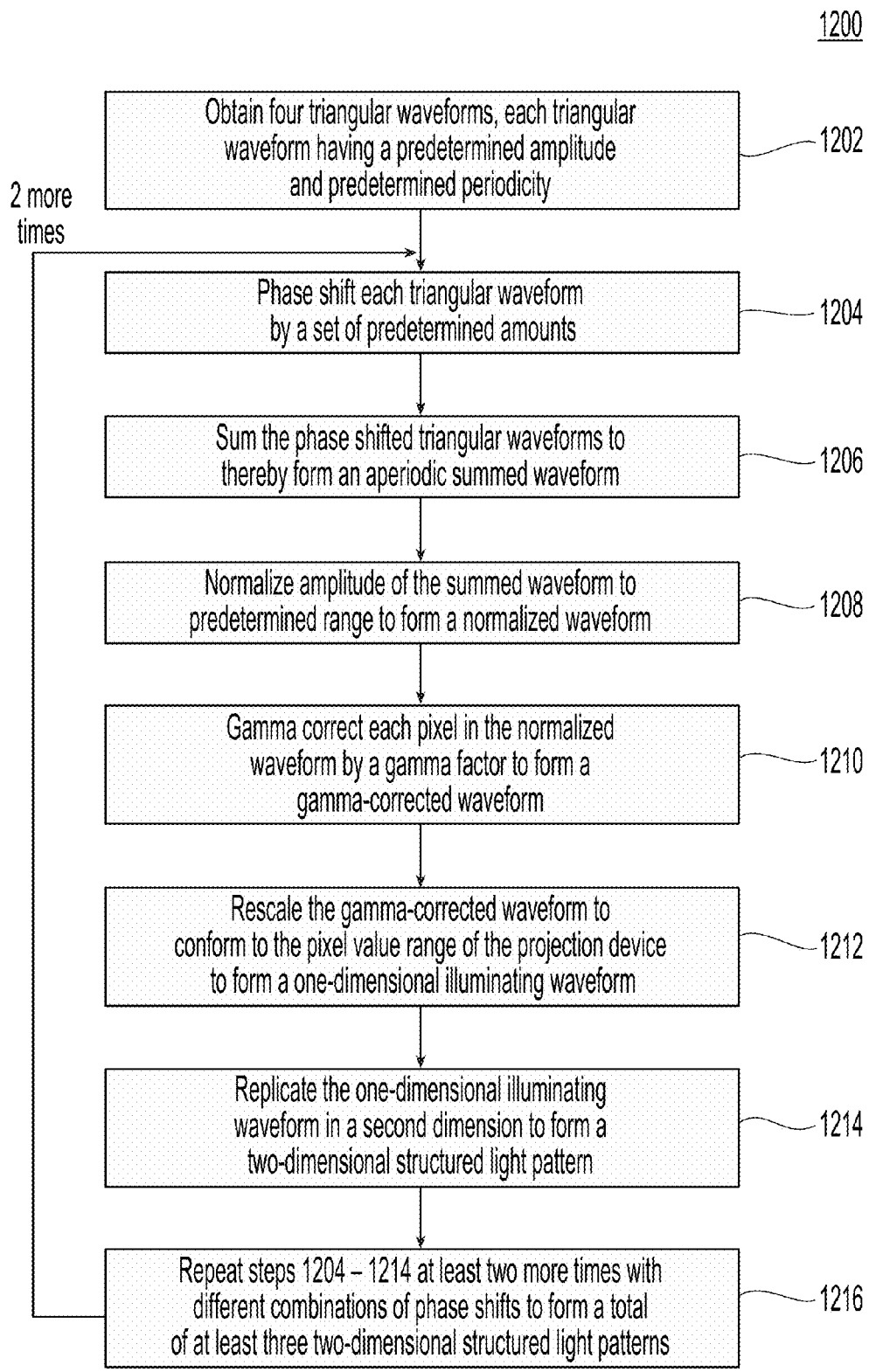
FIG. 12 shows a simplified flow chart for generating structured light patterns for illuminating an object in accordance with the embodiment of FIG. 11.

FIG. 12 presents a detailed flowchart 1200 showing step 1104 of FIG. 11 in detail, in the case where the three structured light patterns must be formed on the fly. In step 1202, four triangular waveforms are obtained, each triangular waveform having a predetermined amplitude and predetermined periodicity. In step 1204, each of the triangular waveforms are phase shifted by a set of predetermined amounts. In step 1206, the phase shifted triangular waveforms are summed to thereby form an aperiodic summed waveform. In step 1208, the amplitudes of the pixel in the summed waveform are normalized to a predetermined range to form a normalized waveform. In step 1210, each pixel in the normalized waveform is modified by a gamma correction factor to a gamma-corrected waveform. In step 1212, the gamma-corrected waveform is rescaled so that the pixel values conform to the pixel value range of the projection device, thereby forming a one-dimensional illuminating waveform. Next, in step 1212, the one-dimensional illuminating waveform is replicated in a second dimension to form a two-dimensional structured light pattern. Finally, step 1214 calls for repeated steps 1204-1214 at least two more times with different combinations of phase shifts to form a total of at least three two-dimensional structured light patterns.

As mentioned above, step 1104 is followed by step 1106, in which the object 150 is illuminated by three two-dimensional structured light patterns, and the two cameras 116, 118 capture the reflected light from each of the three illuminations by the light projector 114. The six captured images from the structured light illumination comprise two sets of three captured images, a first or "left" set being captured by the first camera 116, and a second or "right" set being captured by the second camera 118. Furthermore, each captured image comprises an N×M array of 8-bit gray scale pixels and, as stated above N=768 rows and M=1024 columns in one embodiment.

Each of the three captured images in both sets may be subject to preprocessing prior to any 3-D rendering efforts. This preprocessing may entail pixel-by-pixel gamma correction followed by pixel normalization and image filtering. In one embodiment, gamma correction entails raising each pixel value in each of the six captured images to a power of $\gamma=0.9$. After this, each pixel is normalized relative to identically-positioned pixels within the same set of three captured images. In pseudocode, the pixel-by-pixel normalization for the pixels in either set can be expressed as:

```
For (x=0 to 768):
    for (y=0 to 1024):
        Denom=0;
        Denom=      ImgPattern1[x,y]* ImgPattern1[x,y]
                   +ImgPattern2[x,y]* ImgPattern2[x,y]
                   +ImgPattern3[x,y]* ImgPattern3[x,y] ;
        Denom=square root(Denom);
        ImgPattern1[x,y]=ImgPattern1[x,y]/Denom;
        ImgPattern2[x,y]=ImgPattern2[x,y]/Denom;
        ImgPattern3[x,y]=ImgPattern3[x,y]/Denom.
```

After the pixel-by-pixel normalization of the pixels in both sets of captured images, each of the six images is subject to low-pass filtering by convolving with a 9×9 Gaussian filter, whose kernel may be given by the following matrix of values:

| 3.520553 | 10.36946 | 22.43158 | 35.63873 | 41.5856 | 35.63873 | 22.43158 | 10.36946 | 3.520553 |
|---|---|---|---|---|---|---|---|---|
| 10.36946 | 30.54228 | 66.07015 | 104.9706 | 122.4865 | 104.9706 | 66.07015 | 30.54228 | 10.36946 |
| 22.43158 | 66.07015 | 142.9253 | 227.0761 | 264.9672 | 227.0761 | 142.9253 | 66.07015 | 22.43158 |
| 35.63873 | 104.9706 | 227.0761 | 360.7727 | 420.9731 | 360.7727 | 227.0761 | 104.9706 | 35.63873 |
| 41.5856 | 122.4865 | 264.9672 | 420.9731 | 491.219 | 420.9731 | 264.9672 | 122.4865 | 41.5856 |
| 35.63873 | 104.9706 | 227.0761 | 360.7727 | 420.9731 | 360.7727 | 227.0761 | 104.9706 | 35.63873 |
| 22.43158 | 66.07015 | 142.9253 | 227.0761 | 264.9672 | 227.0761 | 142.9253 | 66.07015 | 22.43158 |
| 10.36946 | 30.54228 | 66.07015 | 104.9706 | 122.4865 | 104.9706 | 66.07015 | 30.54228 | 10.36946 |
| 3.520553 | 10.36946 | 22.43158 | 35.63873 | 41.5856 | 35.63873 | 22.43158 | 10.36946 | 3.520553 |

Once the image preprocessing is complete, the two sets of three captured images are ready for three-dimensional rendering. Three-dimensional rendering can be performed using a number of well-established algorithms, known to those skilled in the art. Examples of such approaches are mentioned discussed in the aforementioned prior art references, and therefore need not be discussed in detail herein.

In one embodiment, the three-D rendering algorithm begins with obtaining candidate seed values in 3-space for each of the three pairs of images. Given that the locations of the first and second cameras 116, 118, and their respectively focal plane arrays 116a, 118a, relative to one another are known, the algorithm constructs candidate epipolar lines and then looks for matches between the left and right images, in each of the three pairs of images. Points around these candidate seed values are expanded to form a 3-D surface model of the object 150, and there are revisited to refine the 3-D surface model. This is followed by a process for cleaning up isolated points, triangle-shaped clusters and other artifacts. Finally, the 3-D surface model is subject to filtering on a W×W patch-wise basis. This is done by using either a median filter which replaces the pixel value of a 3-D surface pixel having coordinates (x, y, z) with the median X, Y and Z values within a W×W window centered about the coordinate (x, y, z)), or an average filter which replaces the pixel value of a 3-D surface pixel having coordinates (x, y, z) with the average X, Y and Z values within a W×W window centered about the coordinate (x, y, z).

Figure 13:
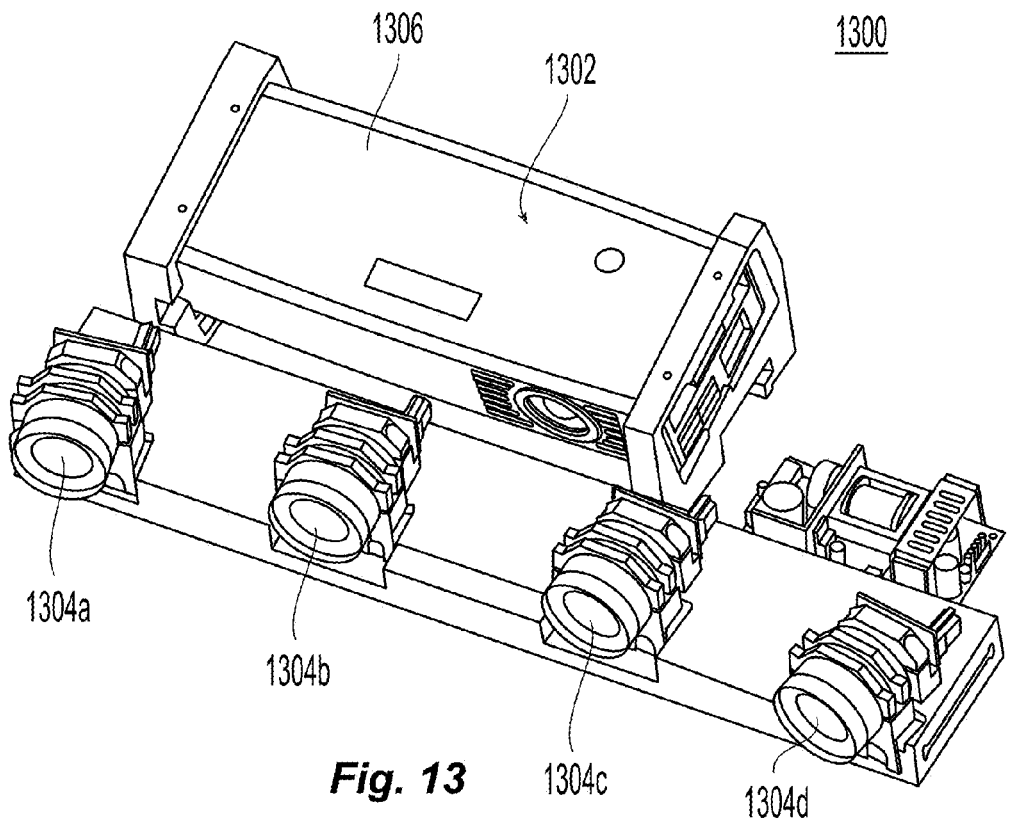
FIG. 13 shows an exemplary embodiment of a light projector in combination with four cameras.

FIG. 13 shows a 3-D rendering system 1300 comprising a light projector 1302 in combination with four cameras 1304a, 1304b, 1304c, 1304d. A computer having the capabilities discussed above may be incorporated into the housing 1306 of the projector 1302. The focal arrays of the four cameras are not in the same geometric plane; however the positions of the focal planes of the four cameras, relative to one another, are known to facilitate processing the various captured image. In this particular embodiment, the focal arrays of the cameras 1304a, 1304b, 1304c, 1304d all have normal vectors which lay in a common plane. Though four cameras are shown in this embodiment, it is understood that other pluralities of cameras, such as 3, 5 or some other number may be employed for 3-dimensional rendering. It is further understood that the cameras need not have normal vectors that all lay in the same plane; the principal criterion being that the positions and orientations of the focal arrays, relative to one another, being known.

Moving Object Rendering

In one embodiment, object 150 may include a moving object, such as a person performing one or more actions (for example, walking, smiling, talking, waving hands, etc.). System 100 may be configured to illuminate the moving object with multiple structured light patterns and perform 3D object rendering of the moving object using the structured light patterns.

For 3D rendering of a moving object, it is desirable that images be captured and rendered substantially in real-time. This can be facilitated by continuously illuminating the moving object with a repeated sequence of a first number N different structured light patterns, capturing the resulting of sets of 2D images, each captured 2D image set having a second number K images, where K is the number of camera locations from which the 2D images are captured, and then applying a moving window comprising a third number M adjacent captured 2D image sets to produce a single 3D rendered object frame. Both N and M are at least three and M is not greater than N. In some embodiments, M and N are equal. K can be 2 (e.g., corresponding to cameras 116 and 118 in one of the above configurations), but take on other values in other embodiments.

Figure 14:
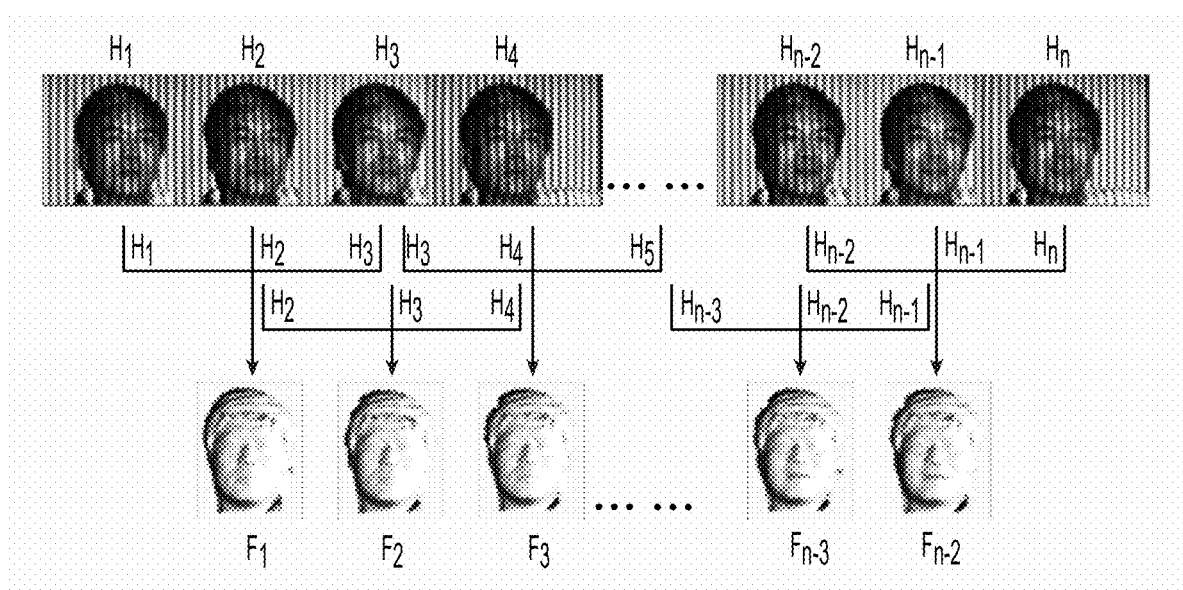
FIG. 14 shows exemplary 3D rendered object frames created based on captures 2D image sets, according to an embodiment of the present invention.

An example of 3D rendering of a moving object is now given where N=3, M=3 and K=2, with reference to FIG. 14.

The projector illuminates the moving object with a repeated sequence of N=3 different structured light patterns G1, G2, G3. The repeated sequence of illuminating structured light patterns may then be represented by $G1_1, G2_2, G3_3, G1_4, G2_5, G3_6, G1_7, G2_8, G3_9$, etc., where the subscript indicates the $i^{th}$ projector illumination.

The corresponding train of captured 2D image sets may then be represented by $H_1, H_2, H_3, H_4, H_5, H_6, H_7, H_8, H_9$, etc, where the subscript indicates the captured 2D image set corresponding to the $i^{th}$ projector illumination. Since K=2 in this example, the train of captured 2D image sets may then be represented by $H_1(L,R), H_2(L,R), H_3(L,R), H_4(L,R), H_5(L,R), H_6(L,R), H_7(L,R), H_8(L,R), H_9(L,R)$, etc., where "L" and "R" correspond to the K=2 (e.g., "Left" and "Right") camera locations.

Any N consecutive captured 2D image sets are the result of N different structured light patterns. Therefore, one may use up to N such captured 2D image sets to create a single 3D rendered object frame.

A single 3D rendered object frame $F_m$ is then created from a moving window of M adjacent captured 2D image sets $H_m(L, R), H_{m+1}(L, R), \ldots, H_{m+M-1}(L,R)$. In this example, since M=3, the first 3D rendered object frame $F_1$ is created from captured 2D image sets $H_1(L, R), H_2(L, R), H_3(L,R)$, the second 3D rendered object frame $F_2$ is created from captured 2D image sets $H_2(L, R), H_3(L, R), H_4(L,R)$, the third 3D rendered object frame $F_3$ is created from captured 2D image sets $H_3(L, R), H_4(L, R), H_5(L,R)$, and so forth. Thus, a moving window comprising M overlapping captured 2D image sets is used to create each 3D rendered object frame.

Figure 20:
FIG. 20 shows a rendered object before having a texture overlay (left side) with the same rendered object after texture overlay (right side).

The 3D rendered object frame (i.e., 3D image) may refer to a 3D shape of the object (left image of FIG. 20) which is obtained from M=3 captured 2D image sets. Texture may be registered/added on the 3D shape of the object to obtain a 3D overlay image (right image of FIG. 20) by the use of an overlay camera which may be a color camera separate from the cameras used for capturing image sets for creating the 3D rendered object frame. Thus, in the arrangement of FIG. 13, one of the four cameras shown may be an overlay camera. Texture may be a 2D image captured by the overlay camera under ambient light or in synchrony with projected non-structured light (e.g., "white" light). In some implementations, one or more of the cameras used for capturing image sets for creating the 3d rendered object frame may be used as the overlay camera.

To realize moving object rendering in real-time or near real-time, the light projector, the camera capture and the 3D object rendering must be sufficiently fast.

Figure 15A:
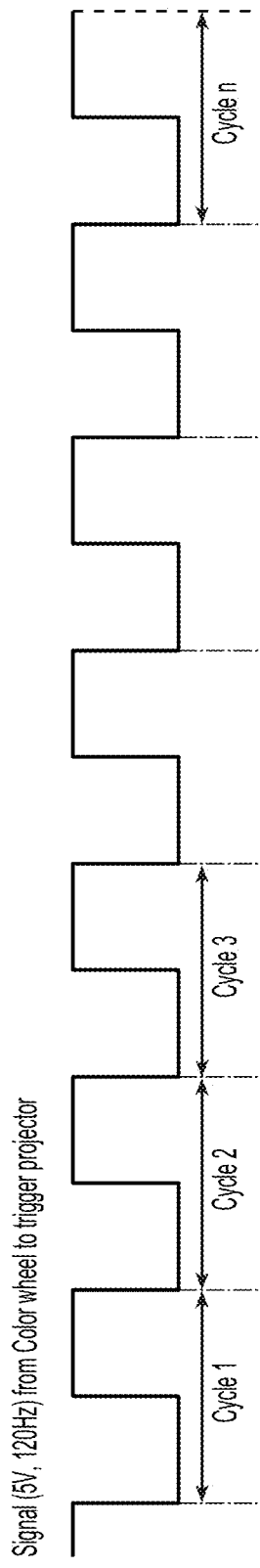
FIGS. 15A and 15B depict a signal and timing chart for a typical color wheel.
Figure 15B:

FIG. 15A depicts a signal generated by a typical color wheel used in typical light projectors, for example, light projector 114. The signal is used to trigger light projector 114 to illuminate the object at 120 Hz. FIG. 15B depicts a timing chart for the typical color wheel. The color wheel is divided into four areas (quadrants) with different intervals, that is, (R)ed, (W)hite, (B)lue, and (G)reen. The R, G, and B areas are used for generating a color image/frame and the W area for increasing the brightness of the image and providing texture to the frame. The timing of the color wheel is illustrated as being 480 Hz (4 color wheels/cycle×120 Hz).

During a first cycle of the color wheel, a first structured light pattern is loaded from memory (for example, memory 138) and fed to light projector 114. As such, when the color wheel's "R", "B", and "G" quadrants of the first cycle pass by, data associated with the same first structured light pattern is loaded onto the "R", "B", and "G" channels of the light projector 114, and cameras 116 and 118 are triggered to capture the images reflected off of the object based on the first structured light pattern. During a second cycle of the color wheel, a second structured light pattern is loaded from memory and fed to light projector 114. As such, when the color wheel's "R", "B", and "G" quadrants of the second cycle pass by, data associated with the same second structured light pattern is loaded onto the "R", "B", and "G" channels, and cameras 116 and 118 are triggered to capture the images reflected off of the object based on the second structured light pattern. During the third cycle of the color wheel, a third structured light pattern is loaded from memory and fed to light projector 114. As such, when the color wheel's "R", "B", and "G" quadrants of the third cycle pass by, data associated with the same third structured light pattern is loaded onto the "R", "B", and "G" channels, and cameras 116 and 118 are triggered to capture the images reflected off of the object based on the third structured light pattern. The three structured light patterns are alternated for subsequent cycles of the color wheel and the light projector 114 projects and cameras 116, 118 capture images in a similar manner as described above. Thus, the speed of illumination and image capture is 120 Hz.

A typical light projector, such as light projector 114 of FIG. 1, may be modified to produce a modified light projector (referred to hereinafter as "MLP") that allows for real-time image illumination. The MLP is fed a repeated sequence of N=3 different structured light patterns to illuminate the moving object. The N=3 different structured light patterns are fed to the R, G, and B channels of the MLP, so that the structured light patterns are projected on the moving object sequentially and repeatedly at 120 Hz.

The MLP is modified by removing the color wheel from the light path to thereby create a light projector devoid of a color wheel in the light path for illuminating the moving object to be rendered, and including a re-writable memory for N=3 different structured light patterns. The rewritable memory of the MLP may include memory areas corresponding to different channels, e.g., the "R", "B" and "G" channels. Thus, the "R", "B", and "G" channel memory areas may store different structured light patterns.

Figure 16A:
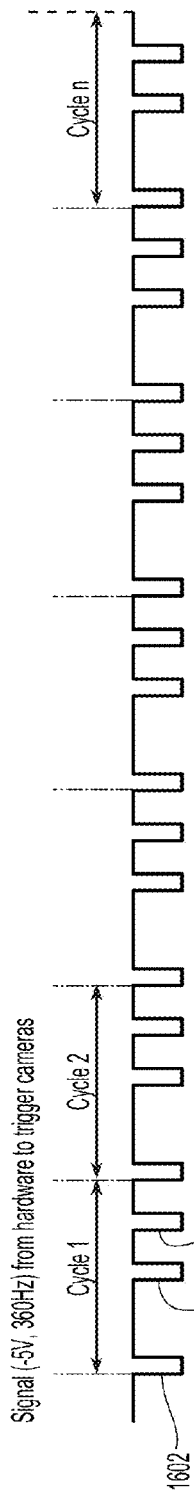
FIGS. 16A, 16B, and 16C depict exemplary trigger signals generated according to an embodiment of the present invention.
Figure 16B:
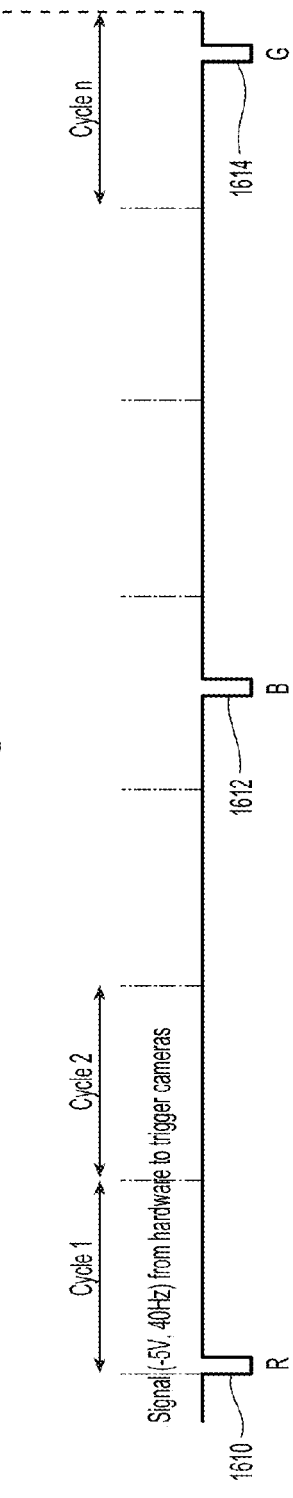

The MLP is triggered to project the N=3 different structured light patterns and illuminate the moving object based on exemplary trigger signals (such as those shown in FIGS. 16A and 16B) generated in response to the position of the color wheel and color filter information on the color wheel. Thus, even though the color wheel is removed from the light path, the position and color filter information associated with the color wheel is still used to generate the trigger signals. FIGS. 16A and 16B illustrate exemplary trigger signals generated by a trigger circuit of the MLP.

In particular, FIG. 16A depicts a timing chart for a color wheel whose timing is 360 frames/sec (fps), the color wheel cycle being 120 Hz. In each cycle of the color wheel, three trigger pulses for "R", "B", and "G" are generated. Thus, the timing for the color wheel is 120*3=360 Hz. For example, in FIG. 16A, a first trigger pulse 1602 is generated when a color wheel's "R" quadrant passes by, a second trigger pulse 1604 is generated when a color wheel's "B" quadrant passes by, and a third trigger pulse 1606 is generated when a color wheel's "G" quadrant passes by. Thus, even if the color wheel were removed from the light path, the color wheel (or its circuit equivalent) generates trigger pulses corresponding to when a particular quadrant would have reach a reference position, just as though the color wheel were still in the light path.

In an embodiment, where N=3, the MLP may be triggered to: load a first structured light pattern $G1_1$ from the "R" channel memory area of the rewritable memory and project the first structured light pattern $G1_1$ in response to the first trigger pulse 1602; load a second structured light pattern $G2_2$ from the "B" channel memory area of the rewritable memory and project the second structured light pattern $G2_2$ in response to the second trigger pulse 1604; and load a third structured light pattern $G3_3$ from the "G"; channel memory area of the rewritable memory and project the third structured light pattern $G3_3$ in response to the third trigger pulse 1606. When the color wheel completes a full cycle including all four quadrants, the first, second, and third trigger pulses are repeated during the next cycle of the color wheel and the MLP is triggered to load and project the three structured light patterns again (for example, $G1_4$, $G2_5$, $G3_6$, and so on) in the same manner as described above. Thus, the MLP is configured to project the structured light patterns at a faster rate than an unmodified light projector. This is because different structured light patterns are projected at the "R", "B", and "G" channels of the MLP rather than the same single structured light pattern in the case of an unmodified light projector.

FIG. 16B depicts a timing chart for a color wheel whose timing is 40 fps, the color wheel cycle being 120 Hz. In a first cycle of the color wheel, one trigger pulse for "R" is generated, the next two cycles (i.e., second and third cycles) are skipped, followed by one trigger pulse of "B" being generated in the fourth cycle. The next two cycles (i.e., fourth and fifth cycles) are skipped, followed by one trigger pulse of "G' being generated in the seventh cycle, and so on. Thus, the timing for the color wheel triggered in accordance with the timing chart of FIG. 16B is 120/3=40 Hz.

For example, in FIG. 16B a first trigger pulse 1610 is generated when a color wheel's "R" quadrant passes by during a first cycle. After skipping two cycles, a second trigger pulse 1612 is generated when a color wheel's "B" quadrant passes by during a fourth cycle. After skipping of two cycles, a third trigger pulse 1614 is generated when a color wheel's "G" quadrant passes by during a seventh cycle, and so on. In an embodiment, where N=3, the MLP may be triggered to: load a first structured light pattern $G1_1$ from the "R" channel memory area of the rewritable memory and project the first structured light pattern $G1_1$ in response to the first trigger pulse 1610; load a second structured light pattern $G2_2$ from the "B" channel memory area of the rewritable memory and project the second structured light pattern $G2_2$ in response to the second trigger pulse 1612; and load a third structured light pattern $G3_3$ from the "G"; channel memory area of the rewritable memory and project the third structured light pattern $G3_3$ in response to the third trigger pulse 1614. Every nine cycles of the color wheel, the trigger pulses 1610, 1612, and 1614 are repeated and the MLP is triggered to load and project the three structured light patterns again (for example, $G1_4$, $G2_5$, $G3_6$, and so on) in the same manner as described above.

Cameras 116 and 118 are triggered to capture two-dimensional (2D) images reflected off of the moving object based on the trigger signals of FIGS. 16A and 16B as well. Thus, the cameras 116 and 118 are triggered to capture the 2D images at substantially the same time as the MLP illumination thereby resulting in faster image capture. The speed of illumination for the MLP and the resulting image capture based on FIG. 16A is 360 Hz. Whereas, the speed of illumination for the MLP and the resulting image capture based on FIG. 16B is 40 Hz.

It will be understood that the timing charts of FIGS. 16A and 16B are exemplary and trigger signals having different timing can be generated based on the capture speed of the cameras used in the system.

For each illumination by the MLP, cameras 116 and 118 are triggered to capture two-dimensional images to thereby create sets of 2D images, each captured 2D image set having K=2 images, one image each for cameras 116 and 118. For example, for the first illumination with the first structured light pattern $G1_1$, cameras 116 and 118 capture a first 2D image set $H_1$ represented by $H_1(L, R)$, for the second illumination with the second structured light pattern $G2_2$, cameras 116 and 118 capture a second 2D image set H2 represented by $H_2(L, R)$, for the third illumination with the third structured light pattern $G3_3$, cameras 116 and 118 capture a third 2D image set $H_3$ represented by $H_3(L, R)$, and so on.

FIG. 14, as described above, depicts a series of 2D images sets ($H_1$-$H_n$) captured by alternating the N=3 structured light patterns. A 3D rendered object frame may be obtained from a moving window of M=3 adjacent captured 2D image sets. For example, rendered 3D object frame $F_1$ may be created from 2D image sets $H_1$, $H_2$, and $H_3$; rendered 3D object frame $F_2$ may be created from 2D image sets $H_2$, $H_3$, and $H_4$; rendered 3D object frame $F_3$ may be created from 2D image sets $H_3$, $H_4$, and $H_5$; and so on. Thus, to obtain a 3D video or continuous 3D images of the moving object, a train of rendered 3D frames may be created from the captured 2D image sets, wherein each 3D frame is formed from a moving window of M adjacent captured image sets.

Figure 17A:
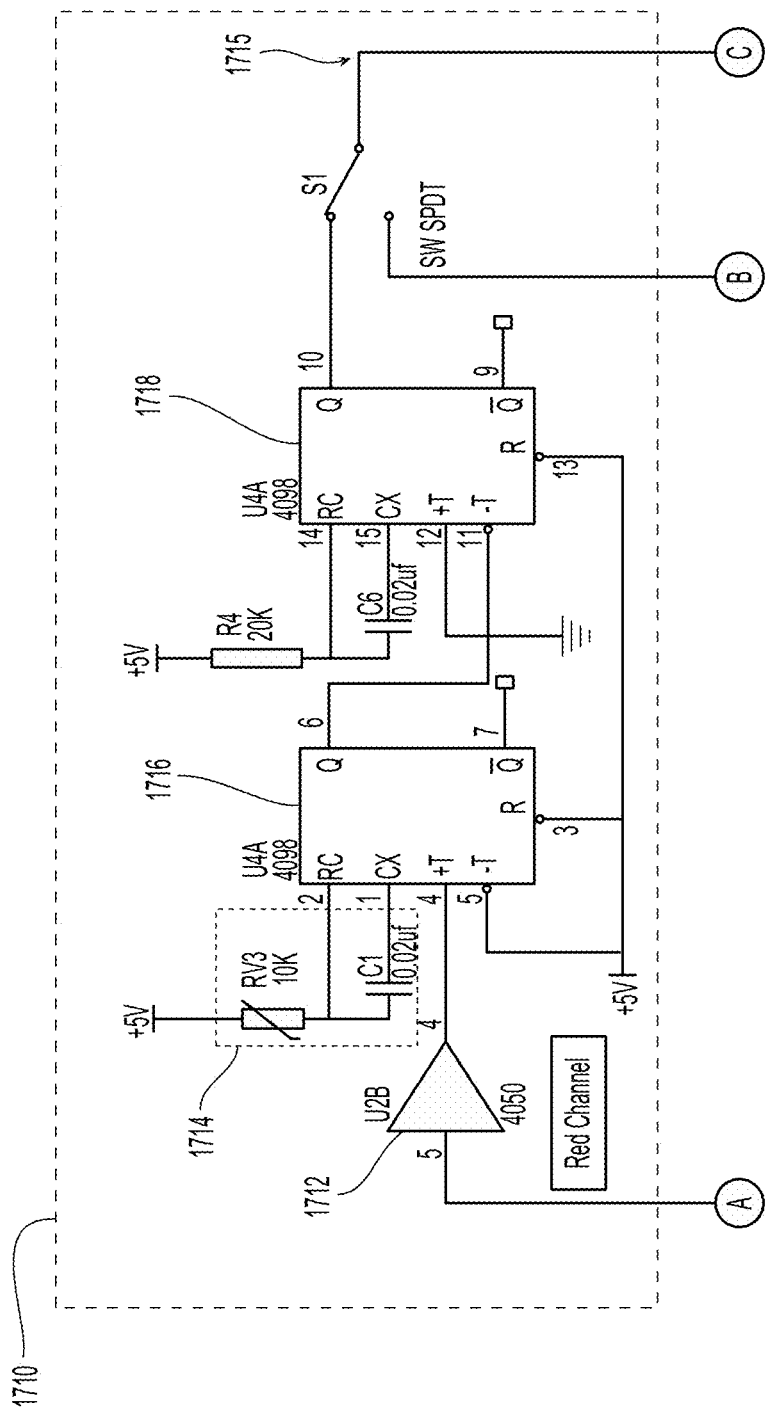
FIG. 17 (17A-17B) shows one embodiment of a trigger circuit configured to generate trigger signals.
Figure 17B:
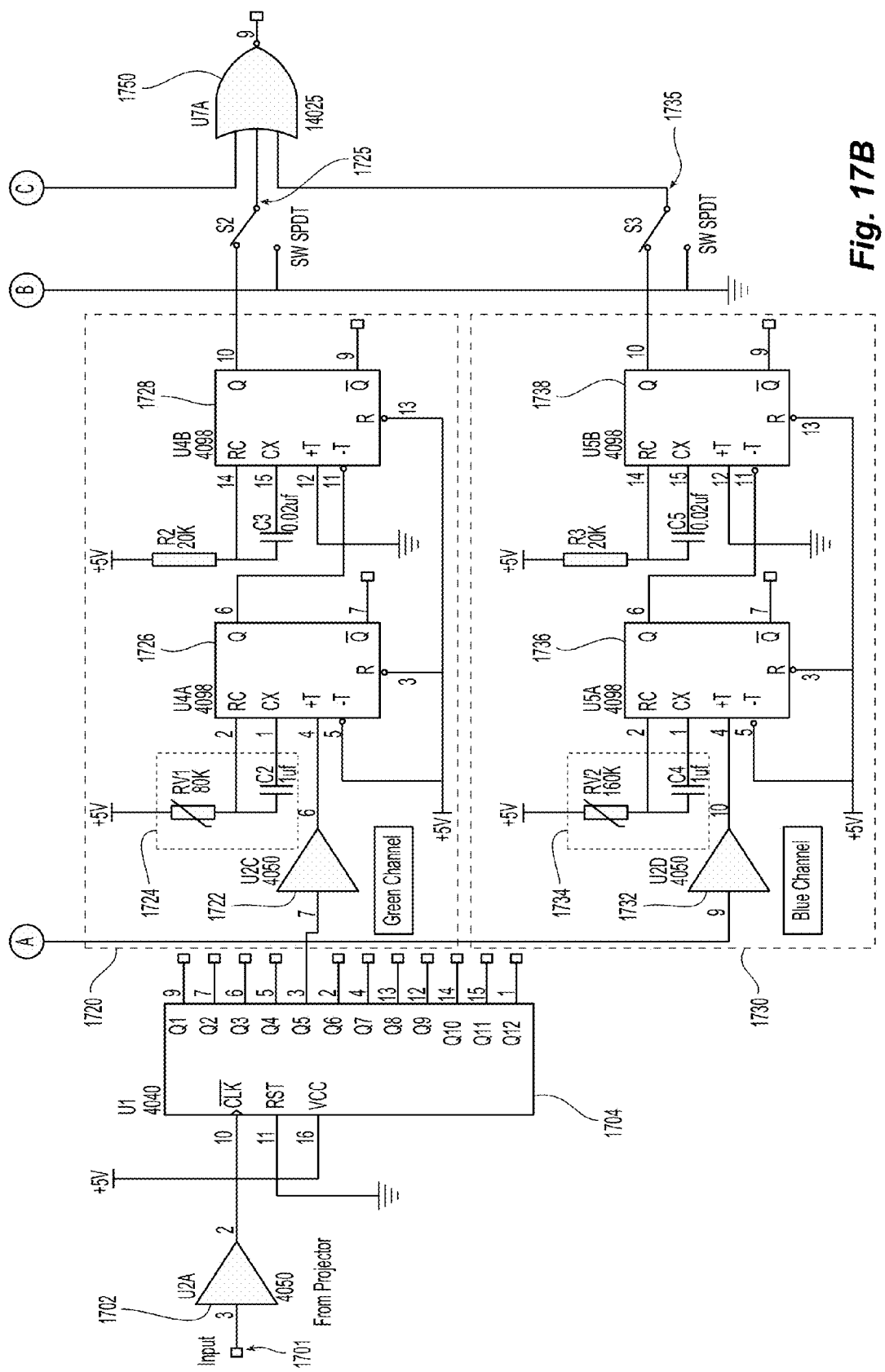
Figure 18A:
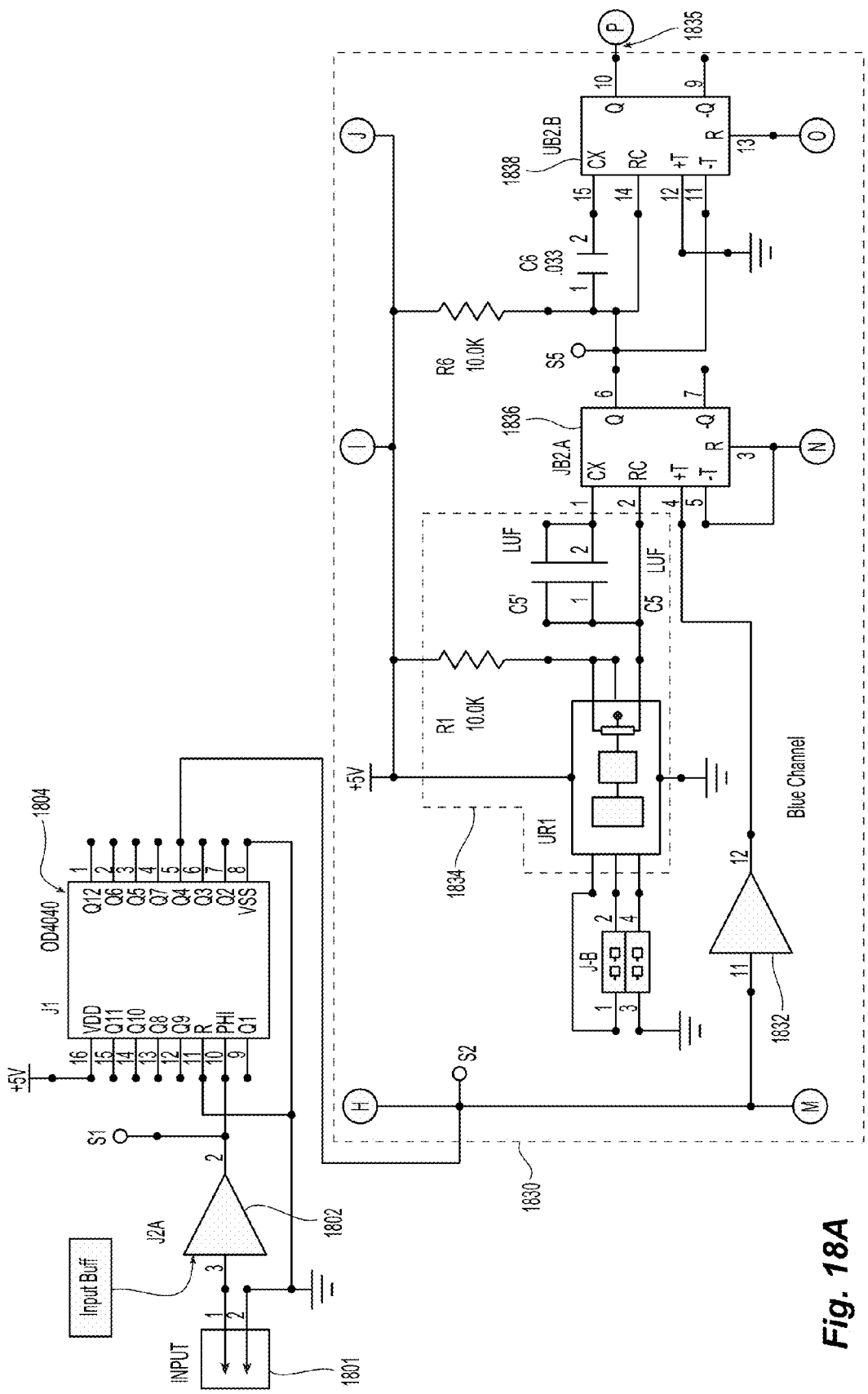
FIG. 18 (18A-18E) shows another embodiment of a trigger circuit configured to generate trigger signals.
Figure 18B:
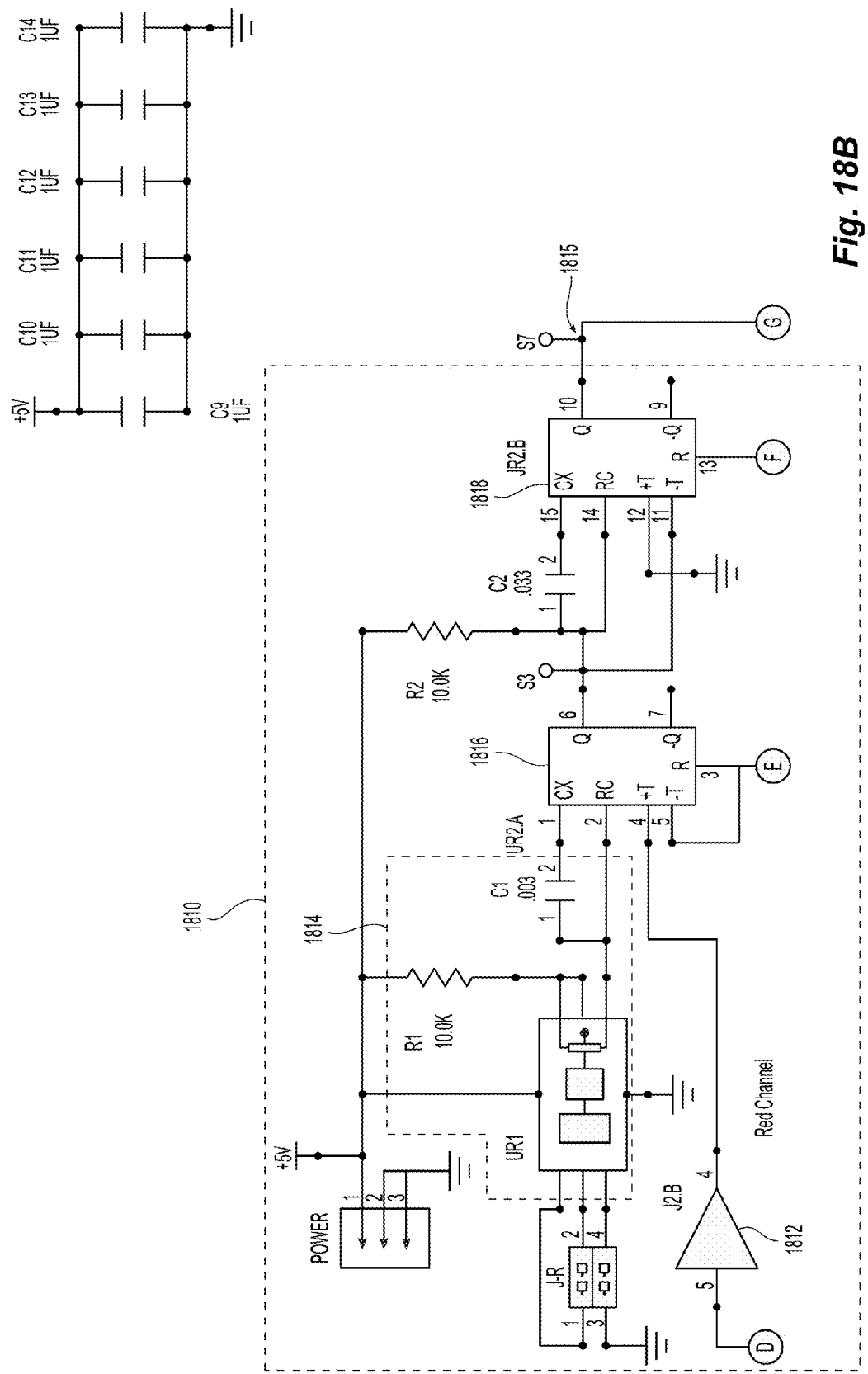
Figure 18C:
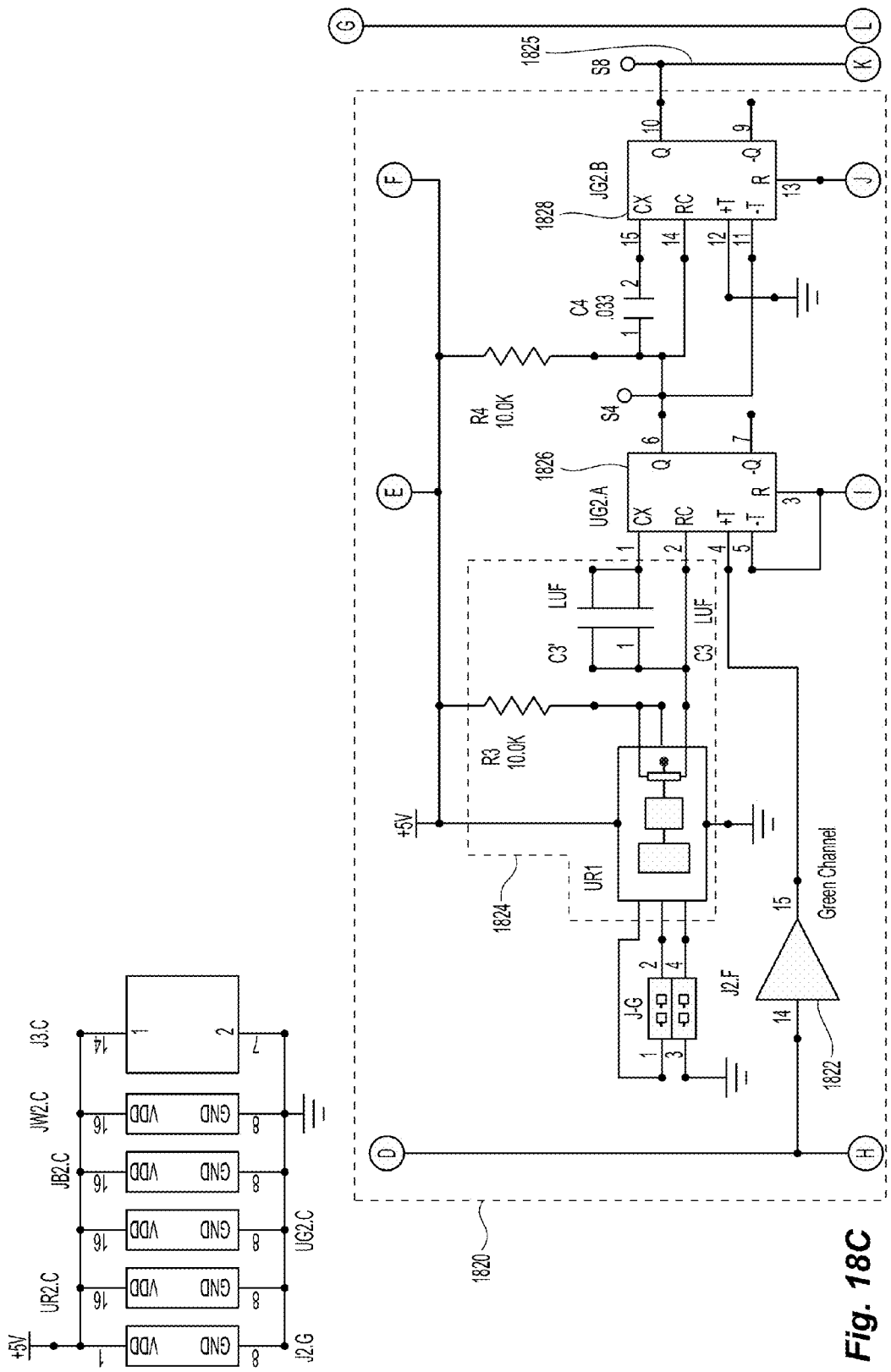
Figure 18D:
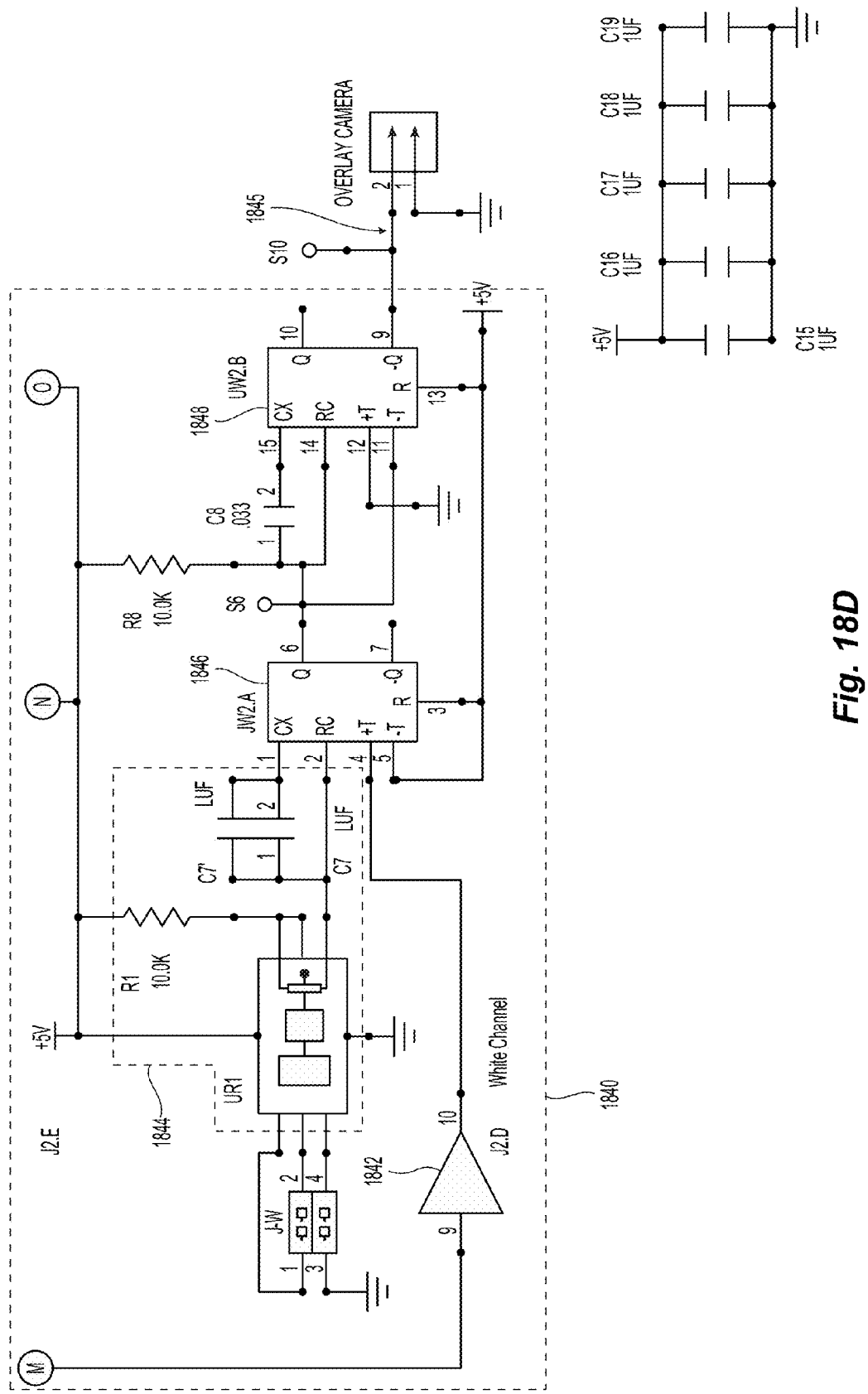
Figure 18E:
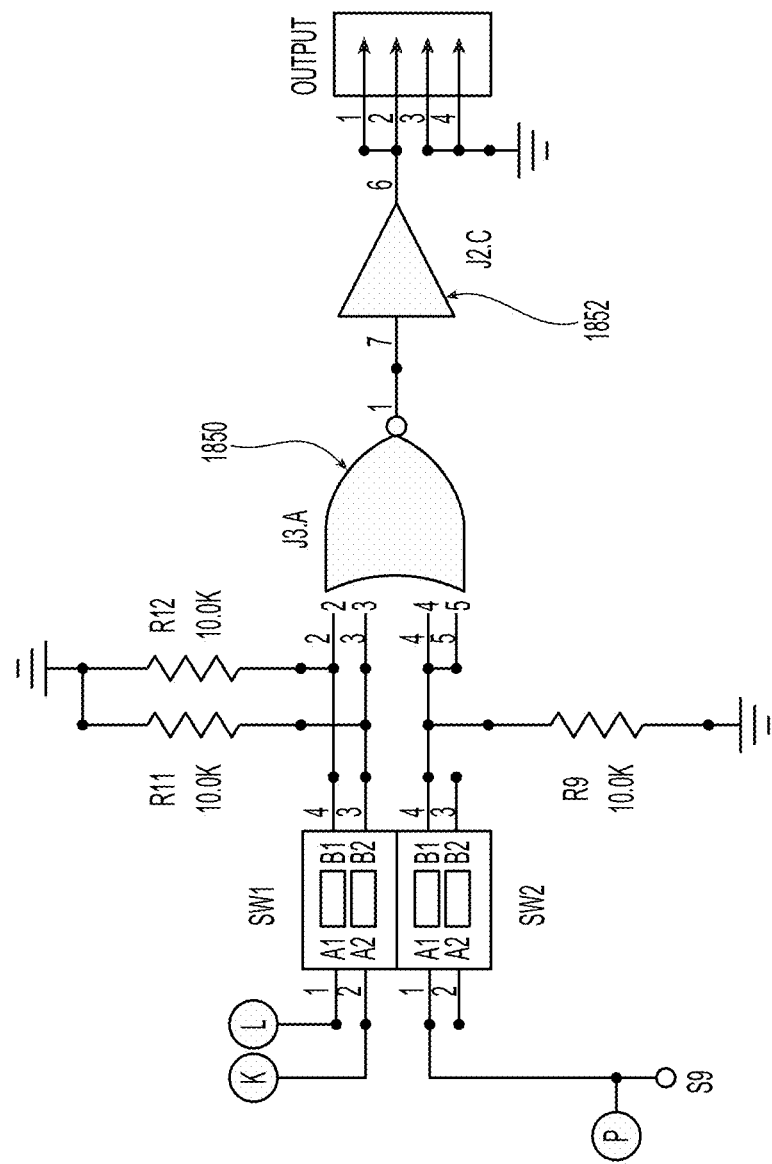

FIG. 17 (comprising FIGS. 17A-17B) and FIG. 18 (comprising FIGS. 18A-18E) depict embodiments of trigger circuits which may be configured to generate trigger signals such as those seen in FIG. 16A and/or FIG. 16B. The trigger circuit of FIG. 17 or FIG. 18 may be used to generate trigger pulses with varying frequency (e.g., by adjusting time delay, as described in more detail below) to reach a desired camera capturing speed, within the color wheel timing of FIG. 15B. The trigger circuit of FIG. 17 or FIG. 18 may be used to generate the trigger signals of FIG. 16A, FIG. 16B, or other trigger signals by combining different frequency dividers and pulse delay channels. In some cases, the frequency divider may be bypassed and pulse delay channels adjusted to generate the trigger signal of 120*3=360 Hz, for example.

FIG. 17 depicts an exemplary trigger circuit configured to generate the trigger pulses for the "R", "B", and "G" channels that may be provided to the imaging cameras (for example, cameras 116, 118) to capture the 2D images.

Figure 16C:
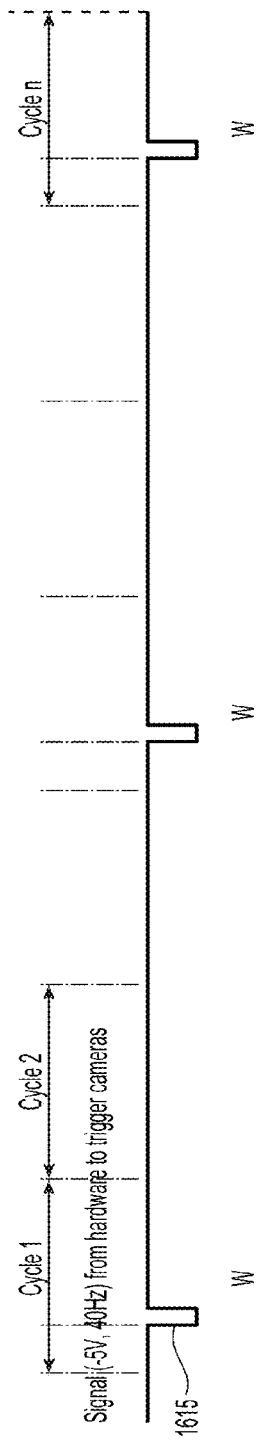

FIG. 18 depicts an exemplary trigger circuit configured to generate the trigger pulses for the "R", "B", and "G" channels and also for an additional white "W" channel. The timing chart of FIG. 16C depicts a trigger signal for the white channel (for color wheel timing of 40 Hz). The trigger pulse 1615 of FIG. 16C is used to trigger an overlay camera (for example, a color camera separate from cameras 116, 118) that may be used to provide 3D texture to the rendered 3D frame. When a color wheel's "W" quadrant passes by, either no light is projected and the resulting captured image is based on reflection from ambient light, or non-structured light is projected and the resulting captured image is based on reflection from the non-structured light. Thus, by using the overlay camera, a 2D texture image of the object under white lighting may be captured. The "white" area of the color wheel may be synchronized with the imaging cameras so that the texture image may be captured (by the overlay camera) and the captured texture image registered onto a closest 3D shape of the object (i.e., 3D rendered object frame). As such, the trigger circuit of FIG. 18 may be used to generate trigger pulses for FIG. 16B for the purpose of creating the 3D rendered object frame, and also generate trigger pulses for FIG. 16C for providing texture to the 3D frame (based on 40 Hz timing).

It can be seen from the foregoing that a system for moving 3-D object rendering may include a first plurality of cameras configured to capture reflected structured light to perform the 3D rendering, and at least one additional camera configured to capture reflected ambient light or projected non-structured light for providing a texture overlay over the 3D rendered moving object. While it is preferred that the one additional camera be a color camera, it may be possible to overlay reflections from non-structured light captured by a non-color camera instead. In such case, it is further understood that one of the plurality of cameras configured to capture reflected structured light may also be used to capture reflected non-structured light, if camera speed so permits.

In some implementations, the MLP may be incorporated in system 100 of FIG. 1 in place of light projector 114 for three-dimensional object rendering of a moving object within a field of view. Illumination/capture device 102 includes a housing which accommodates the MLP and K=2 cameras 116, 118. The trigger circuit 1700 of the MLP, seen in FIG. 17, may be used to generate a trigger signal of FIG. 16B in the following manner.

Referring to FIG. 17, a red "R" pulse may be picked up from the color wheel and may be provided as an input 1701 to the trigger circuit 1700. In other words, the red pulse is used as an input pulse train having a frequency of 120 Hz. The red pulse aligns with the front edge of the "R" area of the first cycle of the color wheel. The input pulse train is provided as input to frequency divider 1704 via input buffer 1702. Frequency divider 1704 is configured to convert 120 Hz into 40 Hz according to a maximum frame rate of the camera(s) used in one embodiment of the system.

Output of frequency divider 1704 is fed into three parallel pulse delay channels 1710, 1720, and 1730. Pulse delay channel 1710 is associated with the "R" (red) channel, pulse delay channel 1720 is associated with the "G" (green) channel, and pulse delay channel 1730 is associated with the "B" (blue) channel. The three pulse delay channels 1710, 1720, and 1730 are substantially similar but have different time delays associated therewith.

Pulse delay channel 1710 includes an input buffer 1712, an RC network 1714, a pulse time delay circuit 1716, and a pulse width generation circuit 1718. A dual monostable multivibrator maybe used for the pulse time delay circuit 1716 and pulse width generation circuit 1718, though other devices may also be used. RC network 1714 may include a typical analog potentiometer (for example, RV3) and a capacitor (for example, C1). The external resistor (RV) and the external capacitor (C) of the RC network 1714 may be used to control the timing of pulse time delay circuit 1716 and pulse width generation circuit 1718. Adjustment of the resistance and/or capacitance values may provide a wide range of pulse time delay. Pulse delay channel 1720 similarly includes input buffer 1722, RC network 1724, pulse time delay circuit 1726, and pulse width generation circuit 1728. Also, pulse delay channel 1730 similarly includes input buffer 1732, RC network 1734, pulse time delay circuit 1736, and pulse width generation circuit 1738. Time delay associated with the three channels 1710, 1720, and 1730 is adjusted via the corresponding pulse time delay circuits and pulse width generation circuits such that an output pulse 1715 from the channel 1710 aligns with the front edge of the "R" area of the first cycle of the color wheel, an output pulse 1735 from the channel 1730 aligns with the front edge of the "B" area of the fourth cycle of the color wheel, and an output pulse 1725 from the channel 1720 aligns with the front edge of the "G" area of the seventh cycle of the color wheel.

Outputs from the three pulse delay channels 1710, 1720, and 1730 are merged into a single pulse train by a Triple 3-input Nor Gate 1750, thereby outputting the trigger signal of FIG. 16B. The buffers are to protect the MLP and cameras 116, 118.

In alternate implementations, system 100 may include an MLP incorporating the trigger circuit 1800 of FIG. 18 and cameras 116, 118. The trigger circuit 1800 of the MLP may to be used generate both the trigger signal of FIG. 16B and the trigger signal of FIG. 16C in the following manner.

An input red pulse train 1801 is provided as input to frequency divider 1804 via input buffer 1802. Frequency divider 1804 is configured to convert 120 Hz into 40 Hz according to a maximum frame rate of the camera(s) used in one embodiment of the system.

Output of frequency divider 1804 is fed into four parallel pulse delay channels 1810, 1820, 1830, and 1840. Pulse delay channel 1810 is associated with the "R" (red) channel, pulse delay channel 1820 is associated with the "G" (green) channel, pulse delay channel 1830 is associated with the "B" (blue) channel, and pulse delay channel 1840 is associated with the "W" (white) channel which is used for texture overlay. The four pulse delay channels 1810, 1820, 1830, and 1840 are substantially similar but have different time delays associated therewith.

Pulse delay channel 1810 includes an input buffer 1812, an RC network 1814, a pulse time delay circuit 1816, and a pulse width generation circuit 1818. A dual monostable multivibrator maybe used for the pulse time delay circuit 1816 and pulse width generation circuit 1818, though other devices may also be used. RC network 1814 may include at least one capacitor (for example, C1) and a digital potentiometer with 256 programmable steps (for example JR1) instead of the typical potentiometer used in the trigger circuit of FIG. 17. An external resistor associated with the digital potentiometer and an external capacitor of the RC network 1814 may be used to control the timing of pulse time delay circuit 1816 and pulse width generation circuit 1818. The values of the resistor associated with the digital potentiometer may be digitally controlled by digital protocols, such as SPI (serial peripheral interface bus), USB interface, or other interface. The digital protocols may be capable of handling programming rates of up to 10 MHz.

Pulse delay channel 1820 similarly includes input buffer 1822, RC network 1824, pulse time delay circuit 1826, and pulse width generation circuit 1828. Also, pulse delay channel 1830 similarly includes input buffer 1832, RC network 1834, pulse time delay circuit 1836, and pulse width generation circuit 1838; and pulse delay channel 1840 may include input buffer 1842, RC network 1844, pulse time delay circuit 1846, and pulse width generation circuit 1848.

Time delay associated with the four channels 1810, 1820, 1830, and 1840 is adjusted via the corresponding pulse time delay circuits and pulse width generation circuits such that an output pulse 1815 from the channel 1810 aligns with the front edge of the "R" area of the first cycle of the color wheel, an output pulse 1835 from the channel 1830 aligns with the front edge of the "B" area of the fourth cycle of the color wheel, an output pulse 1825 from the channel 1820 aligns with the front edge of the "G" area of the seventh cycle of the color wheel.

An output pulse 1845 from the channel 1840 aligns with the front edge of the "W" area of the first cycle (along with output 1815 for "R"), the fourth cycle (along with output 1835 for "B"), and the seventh cycle (along with output 1825 for "G") of the color wheel. In other words, the "W" area of the color wheel is synchronized with the "R", "B", and "G" areas so that a texture 2D image (reflections from either ambient light or non-structured light) may be captured along with the 2D images sets of reflected structured light patterns captured by cameras 116 and 118.

Outputs from the pulse delay channels 1810, 1820, and 1830 are merged into a single pulse train by a Nor Gate 1850, thereby outputting the trigger signal of FIG. 16B via output buffer 1852. Output from pulse delay channel 1840 is provided to an overlay camera for texture purposes. Both input buffers and output buffers may be used to protect the MLP and cameras 116, 118.

The captured 2D image sets may be considered unacceptable if the timing of any of the pulse delay channels changes by more than ±2%. Generally, values associated with resistors and capacitors are known to vary when temperature changes. Also, lower resistance values may cause the oscillator to become unstable or stop altogether. On the other hand, high resistance values can cause the oscillator to become overly sensitive to noise, humidity, and leakage. Thus, the resistance values need to be maintained within a correct range.

In order to provide stable timing for the pulse delay channels, stable resistors and capacitors that have an ultra low temperature coefficient may be used in the corresponding RC networks. For example, the capacitors used in the RC networks (for example, C1, C3, C3', C5, C5', C7, C7') may be stable glass capacitors (having a value of about 1.5 μf), silicon capacitors (having a value of about 1.0 μf), and/or other similar capacitors. The silicon capacitors, for example, offer high stability, up to 10 times better than alternative capacitor technologies, such as, tantalum or multilayer chip type ceramic (MLCC) capacitors.

In some implementations, illumination/capture device 102 that houses the MLP and K cameras may be connected to computer 130. In some implementations, the computer 130 and the illumination/capture device 102 are integrated into a unitary housing. In some implementations, computer 130 is configured to: receive 2D image sets from the K=2 cameras, and for each overlapping set of a number M adjacent captured 2D image sets, obtain a single 3D rendered object frame, to thereby create a train of rendered three-dimensional image frames, each 3D rendered object frame formed from a moving window of said captured 2D image sets, wherein M is at least three and not greater than N.

The system may include a calibration feature/mode to correct for variations in timing of the channel and pulses. As described above, the time delay associated with the pulse delay channels varies with resistance which is digitized (via a digital potentiometer, for example) and can be controlled by a computer, processor, microcontroller, or other processing device through COM, USB, or other port. The computer (for example, computer 130) can vary the resistance and periodically check and align the trigger pulses (via software executed on the computer's processor, for example). Three calibration patterns, for example, square pattern, triangle pattern, and circle pattern may be loaded to the "R", "G", and "B" channel memory areas, respectively. The computer may vary the resistance and the cameras may capture images continuously. The computer may compare the captured image with a known pattern, for example, square pattern. If the captured image matches a square pattern, the timing for the "R" channel may be determined. If the captured image matches a triangle pattern, the timing for the "G" channel may be determined. If the captured image matches a circle pattern, the timing for the "B" channel may be determined. If the captured image does not match any of the known patterns, the timing for "W" channel may be determined. The trigger pulses associated with the channels are aligned based on the determined timing for the channels.

In some implementations, system 100 may include the MLP and cameras 116, 118 each having a frame rate of 30 fps. In these implementations, system speed may be less than or equal to camera capturing speed. In this case, the frequency of a trigger signal generated by the trigger circuit may be 3*7.5=22.5 Hz, which is less than the camera capturing speed of 30 fps. For this system, the trigger circuit of the MLP (for example, trigger circuit of FIG. 17 or FIG. 18) may generate the trigger signal of 22.5 Hz by using a frequency divider that converts 120 Hz into 7.5 Hz (frequency divide by 16) and adjusts time delay via pulse delay channels.

In another implementation, the functionality of the MLP may be incorporated into a new light projector (NLP) which is used in system 100 of FIG. 1 in place of light projector 114 for three-dimensional object rendering of a moving object within a field of view. The new light projector is devoid of a color wheel, but has sufficient timing control and thus will be capable of illuminating an object to be rendered with suitable light patterns and at a frequency consistent with the ability of the cameras used to capture reflected light. In addition, the NLP may be configured to selectively output non-structured light for texture overlay, as described above.

Thus, illumination/capture device 102 may include a housing which accommodates the NLP and K=2 cameras 116, 118. System 100 may further include a re-writable memory for N=3 different structured light patterns. The rewritable memory may include memory areas for first, second, and third channels. The first, second, and third channel memory areas may store different structured light patterns. In some implementations, the re-writable memory may be part of/associated with the computer 130. In some implementations, the re-writable memory may be part of the NLP.

The N=3 structured light patterns are projected onto the moving object sequentially by the NLP at a speed that is less than or equal to capturing speed of each of the K=2 cameras 116, 118.

Illumination/capture device 102 that houses the NLP and the K cameras may be connected to computer 130. In some implementations, the computer 130 and the illumination/capture device 102 are integrated into a unitary housing. In some implementations, computer 130 is configured to: receive 2D image sets from the K=2 cameras, and for each overlapping set of a number M adjacent captured 2D image sets, obtain a single 3D rendered object frame, to thereby create a train of rendered three-dimensional image frames, each 3D rendered object frame formed from a moving window of said captured 2D image sets, wherein M is at least three and not greater than N.

In some implementations, illumination/capture device 102 and/or computer 130 may have a network address, for access over the internet or a local area network. In some implementations, the obtained image data from the cameras and/or the processed 3D rendered object frame data may be used for facial recognition purposes. In some implementations, computer 130 may perform the facial recognition process. In some implementations, computer 130 may transmit, via a network, raw image data obtained from cameras, processed object frame data, and/or one or more vectors of facial features to another computer which may perform the facial recognition process. It will be understood that the illumination/capture device 102 may include light projector 114, the MLP, or the NLP.

In some implementations, the MLP or NLP may be incorporated into the 3-D rendering system 1300 of FIG. 13, in place of the light projector 1302.

Figure 19:
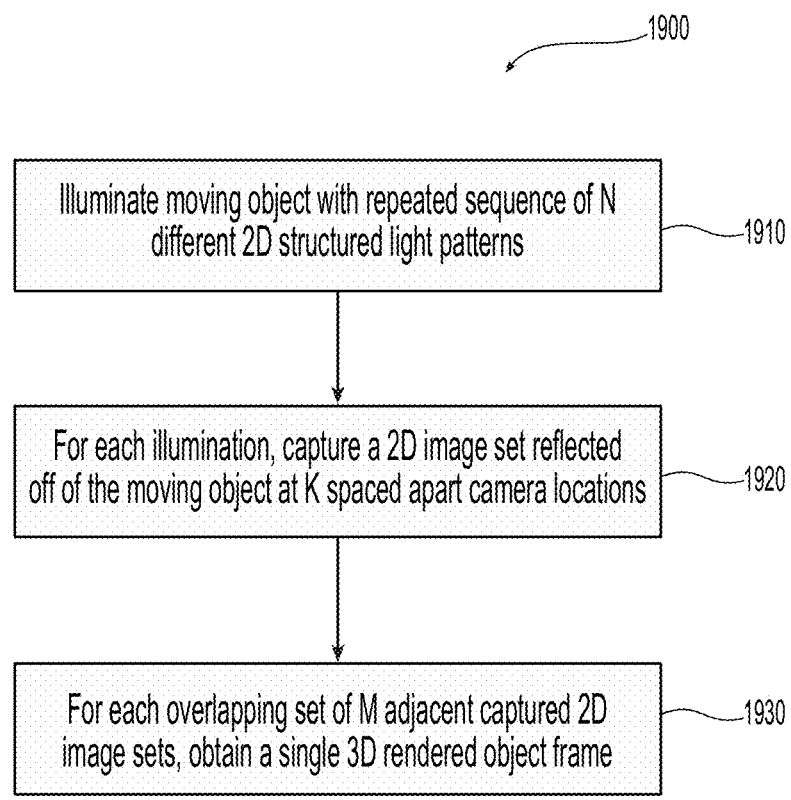
FIG. 19 is a flowchart depicting example operations performed by the system to perform 3D object rendering.

FIG. 19 is a flowchart depicting example operations performed by system 100 to perform 3D object rendering of a moving object within a field of view, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 19. In yet other implementations, one or more operations may be performed simultaneously. In yet other implementations, one or more operations may not be performed. Accordingly, the operations described in FIG. 19 and other drawing figures are exemplary in nature and, as such, should not be viewed as limiting.

In operation 1910, a moving object to be rendered may be illuminated with a repeated sequence of N different two-dimensional structured light patterns, wherein N is at least three.

In an operation 1920, for each illumination, a 2D image set reflected off of the moving object may be captured at a number K spaced apart camera locations to thereby create a train of captured 2D image sets $H_i$, each captured 2D image set comprising K images, i being a counting integer and K being at least two.

In an operation 1930, for each overlapping set of M adjacent captured 2D image sets, $H_m$, $H_{m+1}$, $H_{m+M-1}$, a single three-dimensional rendered object frame $F_m$ may be obtained to thereby create a train of rendered three-dimensional image frames. Each rendered three-dimensional object frame $F_m$ may be formed from a moving window of said captured 2D image sets $H_m$, $H_{m+1}$, ..., $H_{m+M-1}$, wherein M is at least three and not greater than N.

It is understood that in some implementations, steps 1910 and 1920 may each include an additional substep of illuminating the moving object with non-structured light and capturing reflections of the non-structured light for purposes of texture overlay, respectively. It is further understood that in other implementations, no illumination is performed using non-structured light, but step 1920 includes a substep of capturing ambient light reflections of the object for the purpose of texture overlay.

The processing time for obtaining the 3D rendered object frames based on captured 2D image sets is minimized because only one 2D image set needs to processed while using the moving window. For example, in order to obtain 3D rendered object frame $F_2$, 2D image sets $H_2$, $H_3$, and $H_4$ may be needed. However, only $H_4$ needs to be processed because $H_2$ and $H_3$ have been processed while creating 3D rendered object frame $F_1$.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. A method of three-dimensional object rendering of a moving object within a field of view, the method comprising:
   illuminating a moving object to be rendered with a repeated sequence of a number N different 2D structured light patterns, wherein N is at least three;
   for each illumination, capturing a 2D image set reflected off of the moving object at a number K spaced apart camera locations to thereby create a train of captured 2D image sets $H_i$, each captured 2D image set comprising K images, wherein i is a counting integer and K is at least two; and
   for each overlapping set of a number M adjacent captured 2D image sets $H_m$, $H_{m+1}$, ..., $H_{m+M-1}$, obtaining a single 3D rendered object frame $F_m$, to thereby create a train of rendered three-dimensional image frames, each 3D rendered object frame $F_m$ formed from a moving window of said captured 2D image sets $H_m$, $H_{m+1}$, ..., $H_{m+M-1}$, wherein M is at least three and not greater than N; such that:
   successive 3D rendered object frames are obtained from overlapping sets of M adjacent captured 2D image sets.

2. The method according to claim 1, wherein:
   N=3, M=3 and K=2; and
   each of the three two-dimensional structured light patterns is derived from a corresponding aperiodic waveform replicated in a second dimension, each aperiodic waveform being derived from the same set of component triangular waveforms, wherein a given aperiodic waveform is created using a unique set of phase shifts applied to members of said same set of component triangular waveforms.

3. The method according to claim 2, wherein:
   each of the component triangular waveforms has a unique periodicity, with no periodicity being an exact multiple of another periodicity.

4. The method according to claim 3, wherein:
   at least three component triangular waveforms are summed to form each of said aperiodic waveforms.

5. The method according to claim 4, wherein:
   exactly four component triangular waveforms are summed to form each of said aperiodic waveforms.

6. The method according to claim 2, wherein:
   each component triangular waveform comprises a train of isoceles triangles.

7. The method according to claim 2, wherein:
   each aperiodic waveform is subject to signal conditioning, prior to creating the three two-dimensional structured light patterns.

8. The method according to claim 7, wherein said signal conditioning includes:
   gamma correcting pixels of said each periodic waveform; and
   rescaling pixels of said each periodic waveform in accordance with a capability of a light projector used to illuminate the object.

9. The method according to clam 2, wherein the two-dimensional three structured light patterns are created by:
   (a) obtaining four triangular waveforms, each triangular waveform having a predetermined amplitude and predetermined periodicity;
   (b) phase shifting each triangular waveform by a predetermined amount;
   (c) summing the phase shifted triangular waveforms to thereby form an aperiodic summed waveform;
   (d) gamma correcting each pixel in the aperiodic summed waveform;

by a gamma factor to form a gamma-corrected waveform;

(e) rescaling the gamma-corrected waveform to conform to the pixel value range of the projection device, thereby forming a one-dimensional illuminating waveform;

(f) replicating the one-dimensional illuminating waveform in a second dimension to form a two-dimensional structured light pattern; and (g) repeating steps (b)-(f) at least two more times with different combinations of phase shifts to form a total of at least three two-dimensional structured light patterns.

10. A structured light system for three-dimensional object rendering of a moving object within a field of view, comprising:

a light projector configured to illuminate a moving object to be rendered with a repeated sequence of a number N different 2D structured light patterns, wherein N is at least three, a number K cameras configured to capture a 2D image set reflected off of the moving object in response to each illumination to thereby create a train of captured 2D image sets $H_i$, each captured 2D image set comprising K images, wherein i is a counting integer and K is at least two; and a computer configured to:
receive 2D image sets from the K cameras and
for each overlapping set of a number M adjacent captured 2D image sets $H_m, H_{m+1}, \ldots, H_{m+M-}$, obtain a single 3D rendered object frame $F_m$, to thereby create a train of rendered three-dimensional image frames, each 3D rendered object frame $F_m$ formed from a moving window of said captured 2D image sets $H_m$, $H_{m+1}, \ldots, H_{m+M+1}$, wherein M is at least three and not greater than N, such that:
successive rendered three-dimensional image frames are obtained from overlapping sets of M adjacent captured 2D image sets.

11. The structured light system according to claim 10, wherein:
N=3, M=3 and K=2; and
each of the three two-dimensional structured light patterns is derived from a corresponding aperiodic waveform replicated in a second dimension, each aperiodic waveform being derived from the same set of component triangular waveforms, wherein a given aperiodic waveform is created using a unique set of phase shifts applied to members of said same set of component triangular waveforms.

12. The structured light system according to claim 10, wherein:
the projector has a memory having stored thereon a set of a number N 2D structured light patterns.

13. The structured light system according to claim 12, wherein:
each of the N structured light pattern comprises a plurality of pixels having pixel intensities which vary in a first dimension and are constant in a second dimension.

14. The structured light system according to claim 13, wherein:
each structured light pattern is derived from a corresponding aperiodic waveform replicated in a second dimension;
each aperiodic waveform is derived from the same set of component triangular waveforms; and a given aperiodic waveform is created using a unique set of phase shifts applied to members of said same set of component triangular waveforms.

15. The structured light system according to claim 10, wherein:
the light projector is devoid of a color wheel in a light path used to illuminate the moving object to be rendered.

16. The structured light system according to claim 10, wherein:
the system includes at least one camera configured to capture a 2D texture image reflected off of the moving object in response to illumination by ambient; and
the computer is further configured to overlay the captured 2D texture image over said 3D rendered object.

17. The structured light system according to claim 16, wherein:
the at least one camera configured to capture a 2D texture image is a color camera and is distinct from said K cameras.

18. The structured light system according to claim 10, wherein:
the light projector is further configured to illuminate a moving object to be rendered with non-structured light;
the system includes at least one camera configured to capture a 2D texture image reflected off of the moving object in response to the illumination by the non-structured light; and
the computer is further configured to overlay the captured 2D texture image over said 3D rendered object.

19. The structured light system according to claim 18, wherein:
the light projector is configured to illuminate a moving object to be rendered with the non-structured light after each sequence of N different 2D structured light patterns.

20. The structured light system according to claim 18, wherein:
the light projector is devoid of a color wheel in a light path used to illuminate the moving object to be rendered.

21. A light projector configured for use in the structured light system for three-dimensional object rendering according to claim 10, comprising:
at least three memory areas, each having stored therein a different 2D structured light pattern suitable for illuminating a moving object for 3D rendering, wherein:
the light projector is devoid of a color wheel in a light path used to illuminate the moving object;
the light projector is configured to illuminate the moving object with a repeated sequence of the at least three different 2D structured light patterns.

22. The light projector according to claim 21, wherein:
each structured light pattern is derived from a corresponding aperiodic waveform replicated in a second dimension;
each aperiodic waveform is derived from the same set of component triangular waveforms; and
a given aperiodic waveform is created using a unique set of phase shifts applied to members of said same set of component triangular waveforms.

23. The light projector according to claim 22, wherein:
the light projector is further configured to illuminate the moving object with non-structured light after each sequence of the at least three different 2D structured light patterns.

* * * * *